US010356762B2

(12) United States Patent
Qu et al.

(10) Patent No.: US 10,356,762 B2
(45) Date of Patent: *Jul. 16, 2019

(54) SYSTEM AND METHOD FOR MULTIPLE POINT COMMUNICATIONS

(71) Applicant: Futurewei Technologies, Inc., Plano, TX (US)

(72) Inventors: Bingyu Qu, Shenzhen (CN); Weimin Xiao, Hoffman Estates, IL (US); Jialing Liu, Palatine, IL (US)

(73) Assignee: FUTUREWEI TECHNOLOGIES, INC., Plano, TX (US)

(*) Notice: Subject to any disclaimer, the term of this patent is extended or adjusted under 35 U.S.C. 154(b) by 50 days.

This patent is subject to a terminal disclaimer.

(21) Appl. No.: 15/477,903

(22) Filed: Apr. 3, 2017

(65) Prior Publication Data
US 2017/0208584 A1 Jul. 20, 2017

Related U.S. Application Data

(63) Continuation of application No. 13/952,376, filed on Jul. 26, 2013, now Pat. No. 9,615,360.
(Continued)

(51) Int. Cl.
*H04W 4/00* (2018.01)
*H04W 72/04* (2009.01)
(Continued)

(52) U.S. Cl.
CPC ........ *H04W 72/0413* (2013.01); *H04B 7/024* (2013.01); *H04L 5/0035* (2013.01);
(Continued)

(58) Field of Classification Search
USPC ....... 370/236, 252, 328, 329, 330, 331, 332, 370/341
See application file for complete search history.

(56) References Cited

U.S. PATENT DOCUMENTS 8,935,710 B1 * 1/2015 Marathe .................. G06F 9/542 710/260
9,615,360 B2 * 4/2017 Qu ...................... H04W 72/042
(Continued)

FOREIGN PATENT DOCUMENTS

CN 101938748 A 1/2011
EP 2385736 A1 11/2011
(Continued)

OTHER PUBLICATIONS

"3rd Generation Partnership Project; Technical Specification Group Radio Access Network; Evolved Universal Terrestrial Radio Access (E_UTRA); Physical layer procedures (Release 10)," 3GPP TS 36.213 V10.6.0, Technical Specification, Jun. 2012, 125 pages.
(Continued)

*Primary Examiner* — Kwang B Yao
*Assistant Examiner* — Nguyen H Ngo
(74) *Attorney, Agent, or Firm* — Slater Matsil, LLP

(57) ABSTRACT

A method for multiple point communications includes configuring a set of first communications system resources to form a plurality of first communications system resource groups, each first communications system resource group including a plurality of channels, and configuring a set of second communications system resources for each one of the plurality of first communications system resource groups, the set of second communications system resources used to convey a feedback transmission. The method also includes signaling information about the plurality of first communications system resource groups to a first user equipment, and signaling information about the sets of second communications system resources associated with the plurality of first communications system resource groups to the first user equipment.

35 Claims, 23 Drawing Sheets

Related U.S. Application Data

(60) Provisional application No. 61/676,643, filed on Jul. 27, 2012.

(51) Int. Cl.

| | | |
|---|---|---|
| *H04L 5/00* | (2006.01) | |
| *H04W 76/25* | (2018.01) | |
| *H04W 76/15* | (2018.01) | |
| *H04B 7/024* | (2017.01) | |
| *H04W 56/00* | (2009.01) | |

(52) U.S. Cl.
CPC .......... *H04L 5/0037* (2013.01); *H04L 5/0053* (2013.01); *H04L 5/0091* (2013.01); *H04W 56/0005* (2013.01); *H04W 72/042* (2013.01); *H04W 72/0473* (2013.01); *H04W 76/15* (2018.02); *H04W 76/25* (2018.02); *H04L 5/001* (2013.01); *H04L 5/0044* (2013.01); *H04L 5/0055* (2013.01); *H04L 5/0058* (2013.01)

(56) References Cited

U.S. PATENT DOCUMENTS

| | | | |
|---|---|---|---|
| 2002/0117135 A1* | 8/2002 | Nozue | F01L 1/02 |
| | | | 123/90.31 |
| 2008/0014951 A1 | 1/2008 | Laroia et al. | |
| 2008/0037496 A1 | 2/2008 | Smith et al. | |
| 2009/0310542 A1 | 12/2009 | Mu et al. | |
| 2010/0173660 A1 | 7/2010 | Liu et al. | |
| 2010/0195615 A1* | 8/2010 | Lee | H04J 11/0026 |
| | | | 370/330 |
| 2011/0026421 A1 | 2/2011 | Luo et al. | |
| 2011/0090825 A1 | 4/2011 | Papasakellariou et al. | |
| 2011/0235603 A1* | 9/2011 | Cheng | H04L 5/0032 |
| | | | 370/329 |
| 2011/0261767 A1 | 10/2011 | Ji et al. | |
| 2011/0268077 A1* | 11/2011 | Wan | H04J 11/0053 |
| | | | 370/329 |
| 2011/0299490 A1 | 12/2011 | Nordstrom et al. | |
| 2012/0033624 A1 | 2/2012 | Luo et al. | |
| 2012/0063383 A1 | 3/2012 | Barbieri et al. | |
| 2012/0176996 A1* | 7/2012 | Kim | H04W 72/0413 |
| | | | 370/329 |
| 2012/0208547 A1* | 8/2012 | Geirhofer | H04B 7/0626 |
| | | | 455/452.2 |
| 2012/0282936 A1* | 11/2012 | Gao | H04L 5/0023 |
| | | | 455/450 |
| 2013/0100829 A1 | 4/2013 | Ishii et al. | |
| 2013/0100906 A1 | 4/2013 | Yano et al. | |
| 2013/0195025 A1* | 8/2013 | Chatterjee | H04W 4/70 |
| | | | 370/329 |
| 2013/0201919 A1* | 8/2013 | Bai | H04W 72/082 |
| | | | 370/328 |
| 2013/0208604 A1* | 8/2013 | Lee | H04L 25/0226 |
| | | | 370/252 |
| 2013/0244670 A1 | 9/2013 | Biermann et al. | |
| 2013/0250881 A1* | 9/2013 | Liao | H04W 36/08 |
| | | | 370/329 |
| 2013/0272170 A1* | 10/2013 | Chatterjee | H04W 28/02 |
| | | | 370/280 |
| 2013/0286997 A1 | 10/2013 | Davydov et al. | |
| 2013/0301542 A1* | 11/2013 | Krishnamurthy | H04W 52/50 |
| | | | 370/329 |
| 2013/0301571 A1 | 11/2013 | Sorrentino et al. | |
| 2014/0010182 A1 | 1/2014 | Chunli et al. | |
| 2014/0044061 A1 | 2/2014 | Yue et al. | |
| 2014/0071934 A1 | 3/2014 | Frenne et al. | |
| 2014/0241298 A1 | 8/2014 | Park et al. | |
| 2015/0043369 A1 | 2/2015 | Kim et al. | |
| 2015/0043469 A1 | 2/2015 | Kim et al. | |
| 2015/0085806 A1 | 3/2015 | Dinan | |
| 2016/0021653 A1* | 1/2016 | Papasakellariou | H04W 36/385 |
| | | | 370/329 |

FOREIGN PATENT DOCUMENTS

| | | |
|---|---|---|
| EP | 2557836 A1 | 2/2013 |
| EP | 2584818 A1 | 4/2013 |
| EP | 2660992 A1 | 11/2013 |
| JP | 2011223115 A | 11/2011 |
| JP | 2012124887 A | 6/2012 |
| JP | 2014504816 A | 2/2014 |
| WO | 2011036986 A1 | 3/2011 |
| WO | 2011087272 A2 | 7/2011 |
| WO | 2011098136 A1 | 8/2011 |
| WO | 2011161744 A1 | 12/2011 |
| WO | 2012070839 A2 | 5/2012 |
| WO | 2012088876 A1 | 7/2012 |

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11), 3GPP TS 36.300 V11.2.0, Technical Specification, Jun. 2012, 201 pages.

Ericsson, et al., "Deployment and backhaul constraints for CoMP," TSG-RAN WG1 #63bis, R1-110452, Dublin, Ireland, Jan. 17-21, 2011, 4 pages.

Huawei, "System Performance Evaluation of Downlink CoMP[online]," 3GPP TSG-RAN WG1#56, R1-090822, Athens, Greece, Feb. 9-13, 2009, 4 pages.

\* cited by examiner

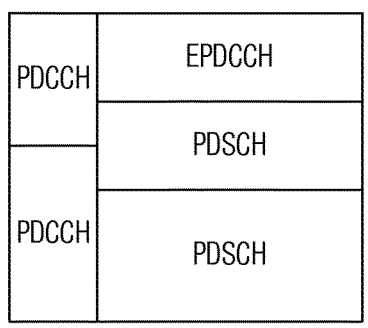
DOWNLINK
(CELL 1)
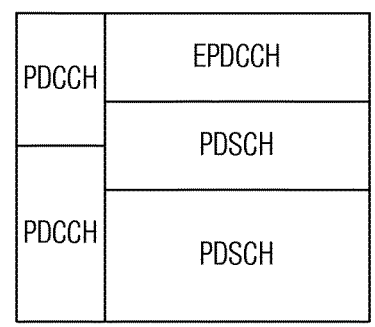
DOWNLINK
(CELL 2)
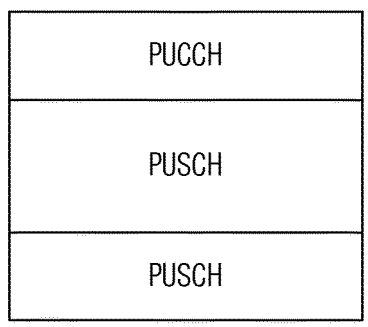
UPLINK
(CELL 1)
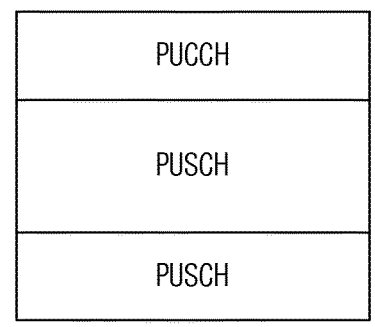
UPLINK
(CELL 2)
*Fig. 11*

1400
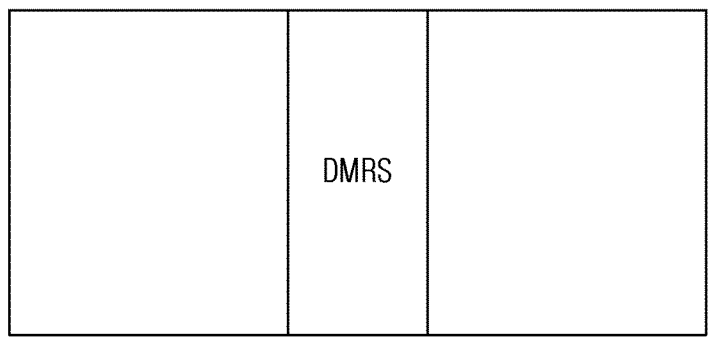
PUCCH
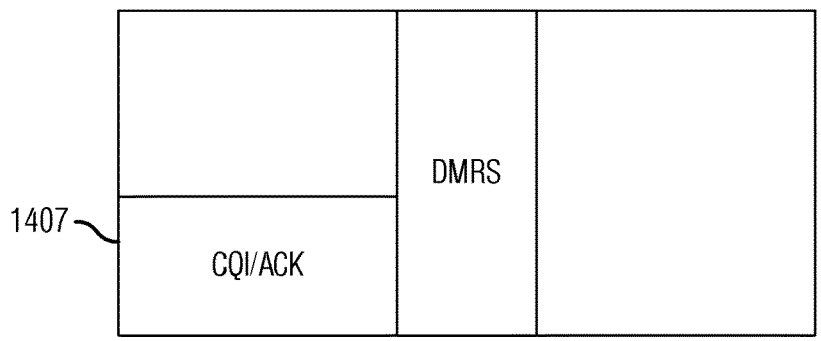
PUSCH
*Fig. 14*

REL-11: COMP OF MACRO1 + PICO2 WITH FAST BACKHAUL -> 1 HARQ PROCESS -> 1 A/N RESOURCE

REL-11: COMP OF MACRO3 + PICO4 WITH ANY BACKHAUL -> NOT SUPPORTED

REL-12: COMP OF MACRO5 + PICO6 WITH ANY BACKHAUL -> 2 GROUPS OF HARQ RESOURCES -> 2 A/N RESOURCES

REL-12: COMP OF MACRO7 + (PICO8 WITH FAST BACKHAUL TO MACRO7) + (PICO9 WITH ANY BACKHAUL TO MACRO7) -> 2 GROUPS OF HARQ RESOURCES -> 2 A/N RESOURCES

REL-11 CA: eNB WITH 2 CCS -> 2 HARQ PROCESSES -> 1 A/N RESOURCE

REL-11 CA: eNB1 WITH CC2 + eNB3 WITH CC4 (CONNECTED BY ANY BACKHAUL) -> NOT SUPPORTED

→

REL-12+: eNB1 WITH 1 OR 2 CCS + eNB2 WITH 1 OR 2 CCS (CONNECTED BY ANY BACKHAUL) -> 2 GROUPS OF HARQ PROCESSES -> 2 A/N RESOURCES

*Fig. 17b*

SYSTEM AND METHOD FOR MULTIPLE POINT COMMUNICATIONS

CROSS-REFERENCE TO RELATED APPLICATIONS

This application is a continuation of U.S. patent application Ser. No. 13/952,376, filed on Jul. 26, 2013, which claims the benefit of U.S. Provisional Application No. 61/676,643, filed on Jul. 27, 2012, both of which applications are hereby incorporated herein by reference.

TECHNICAL FIELD

The present disclosure relates generally to digital communications, and more particularly to a system and method for multiple point communications.

BACKGROUND

Generally, in a communications system, such as a Third Generation Partnership Project (3GPP) Long Term Evolution (LTE) compliant communications system, there is a plurality of communications controllers. The plurality of communications controllers serves communications devices by controlling communications to and from the communications devices. Communications controllers may also be commonly referred to as enhanced NodeBs (eNBs), NodeBs, base stations, and the like. Communications devices may also be commonly referred to as user equipments (UEs), mobile stations, users, subscribers, terminals, and the like. As shown in FIG. 1a, a communications system 100 includes an eNB 105, and UEs 110 and 112. Transmissions from eNB 105 to UE 110 are referred to as downlink (DL) transmissions and transmissions from UE 112 to eNB 105 are referred to as uplink (UL) transmissions.

Carrier aggregation (CA) and coordinated multiple point (CoMP) operation have been proposed as techniques to help improve communications performance. In CA, multiple component carriers may be aggregated to support simultaneous transmission to a UE or simultaneous reception from a UE. In CoMP, multiple communications points (or simply, multiple points) may be coordinated to serve a UE. A point may be a transmission point if it is transmitting or a reception point if it is receiving. As an example, two transmission points may individually transmit on different component carriers to a UE, or multiple transmission points may coordinate to transmit to a UE. Similarly, a UE may transmit to multiple reception points on different component carriers, or a UE may transmit to multiple reception points.

SUMMARY

Example embodiments of the present disclosure which provide a system and method for multiple point communications.

In accordance with an example embodiment of the present disclosure, a method for multiple point communications is provided. The method includes configuring, by a controller device, a set of first communications system resources to form a plurality of first communications system resource groups, each first communications system resource group including a plurality of channels, and configuring, by the controller device, a set of second communications system resources for each one of the plurality of first communications system resource groups, the set of second communications system resources used to convey a feedback transmission. The method also includes signaling, by the controller device, information about the plurality of first communications system resource groups to a first user equipment, and signaling, by the controller device, information about the sets of second communications system resources associated with the plurality of first communications system resource groups to the first user equipment.

In accordance with another example embodiment of the present disclosure, a method for multiple point communications is provided. The method includes receiving, at a user equipment, information from a communications controller about a plurality of first communications system resource groups configured in a communications system, each first communications system resource group including a plurality of channels, and receiving, at the user equipment, information about a set of first communications system resources for a feedback transmission for each one of the plurality of first communications system resource groups. The method also includes decoding, by the user equipment, the channels of the plurality of first communications system resource groups in accordance with the information about the plurality of first communications system resource groups, and transmitting, by the user equipment, feedbacks reflective of the decoding of the channels, wherein the transmitting is in accordance with the information about the set of first communications system resources.

In accordance with another example embodiment of the present disclosure, a controller device is provided. The controller device includes a processor, and a transmitter operatively coupled to the processor. The processor specifies a set of first communications system resources to form a plurality of first communications system resource groups, each first communications system resource group including a plurality of channels, and specifies a set of second communications system resources for each one of the plurality of first communications system resource groups, the set of second communications system resources used to convey a feedback transmission. The transmitter signals information about the plurality of first communications system resource groups to a first user equipment, and signals information about the sets of second communications system resources associated with the plurality of first communications system resource groups to the first user equipment.

In accordance with another example embodiment of the present disclosure, a user equipment is provided. The user equipment includes a receiver, a processor operatively coupled to the receiver, and a transmitter operatively coupled to the processor. The receiver receives information from a controller device about a plurality of first communications system resource groups of a communications system, each first communications system resource group including a plurality of channels, and receives information from the controller device about a set of first communications system resources for a feedback transmission for each one of the plurality of first communications system resource groups. The processor decodes the channels of the plurality of first communications system resource groups in accordance with the information about the plurality of first communications system resource groups. The transmitter transmits feedbacks reflective of the decoding of the channels, wherein the transmitting is in accordance with the information about the set of first communications system resources.

One advantage of an embodiment is that a fast backhaul is not required to connect participants of carrier aggregation (CA) and/or coordinated multiple point (CoMP) operation other than UE(s). Therefore, greater flexibility is enabled for CA and/or CoMP operation, permitting greater communications system utilization.

A further advantage of an embodiment is that communications system resources are configured in accordance with backhaul characteristics, enabling the management of CA and/or CoMP operation to be managed according to the same backhaul characteristics. Hence, CA and/or CoMP operation management is simpler.

BRIEF DESCRIPTION OF THE DRAWINGS

For a more complete understanding of the present disclosure, and the advantages thereof, reference is now made to the following descriptions taken in conjunction with the accompanying drawing, in which:

FIG. 11 illustrates example communications system resources according to example embodiments described herein;

FIG. 14 illustrates an example diagram of resources highlighting a PUCCH, as well as a PUCCH embedded in a PUSCH according to example embodiments described herein;

FIG. 17b illustrates an example communications configuration using CA and CoMP according to example embodiments described herein;

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to multiple point communications. For example, a controller device configures a set of first communications system resources to form a plurality of first communications system resource groups, each first communications system resource group including a plurality of channels, and configures a set of second communications system resources for each one of the plurality of first communications system resource groups, the set of second communications system resources used to convey a feedback transmission. The controller device also signals information about the plurality of first communications system resource groups to a first user equipment, and signals information about the sets of second communications system resources associated with the plurality of first communications system resource groups to the first user equipment. As another example, a user equipment receives information from a communications controller about a plurality of first communications system resource groups configured in a communications system, each first communications system resource group including a plurality of channels, and receives information about a set of first communications system resources for a feedback transmission for each one of the plurality of first communications system resource groups. The user equipment also decodes the channels of the plurality of first communications system resource groups in accordance with the information about the plurality of first communications system resource groups, and transmits feedbacks reflective of the decoding of the channels, wherein the transmitting is in accordance with the information about the set of first communications system resources.

The present disclosure will be described with respect to example embodiments in a specific context, namely a Third Generation Partnership Project (3GPP) Long Term Evolution (LTE) compliant communications system that supports CA and/or CoMP operation to increase overall communications system utilization. The disclosure may also be applied, however, to other standards compliant and non-standards communications systems that support CA and/or CoMP operation.

Figure 1A:
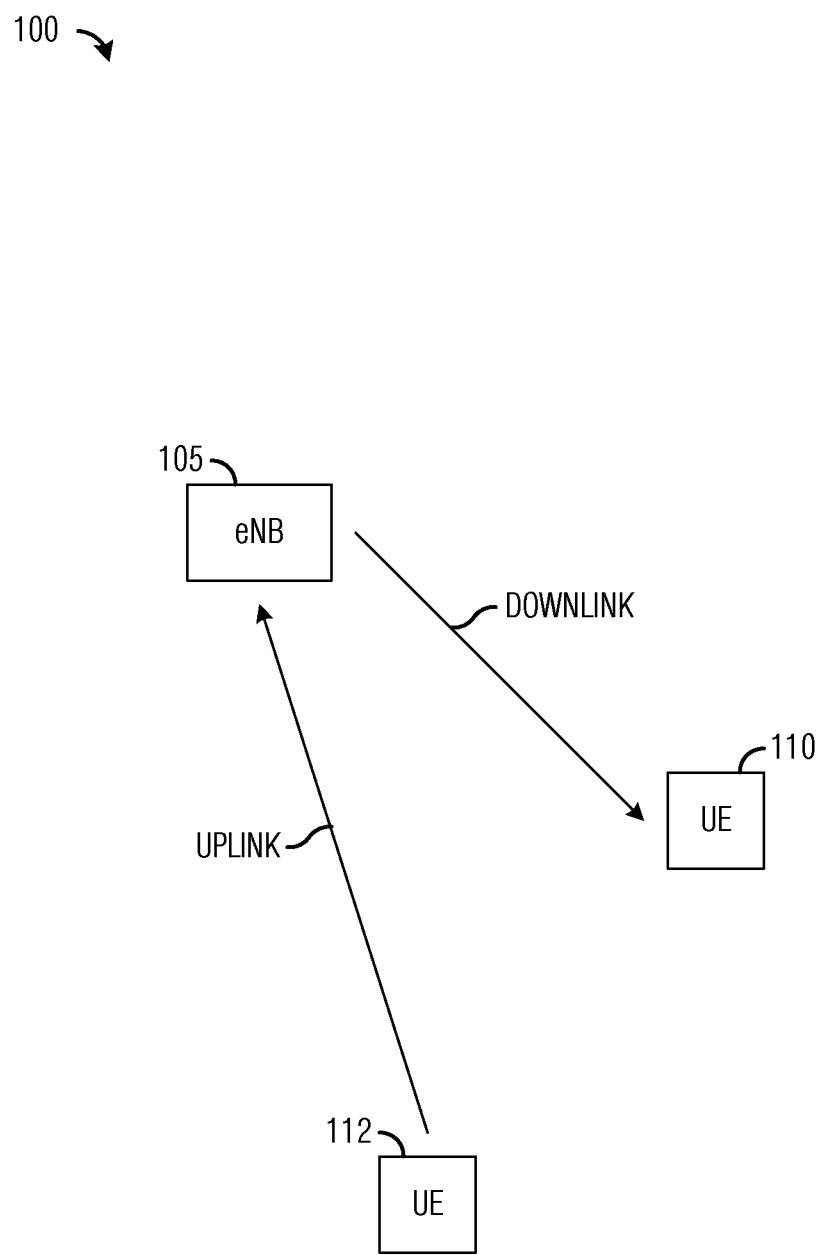
FIG. 1a illustrates an example communications system highlighting downlink and uplink communications according to example embodiments described herein.

FIG. 1a illustrates a communications system 100 highlighting downlink and uplink communications. As shown in FIG. 1a, communications system 100 includes an eNB 105, and UEs 110 and 112. Transmissions from eNB 105 to UE 110 are referred to as downlink (DL) transmissions and transmissions from UE 112 to eNB 105 are referred to as uplink (UL) transmissions. While it is understood that communications systems may employ multiple eNBs capable of communicating with a number of UEs, only one eNBs, and two UEs are illustrated for simplicity.

Figure 1B:
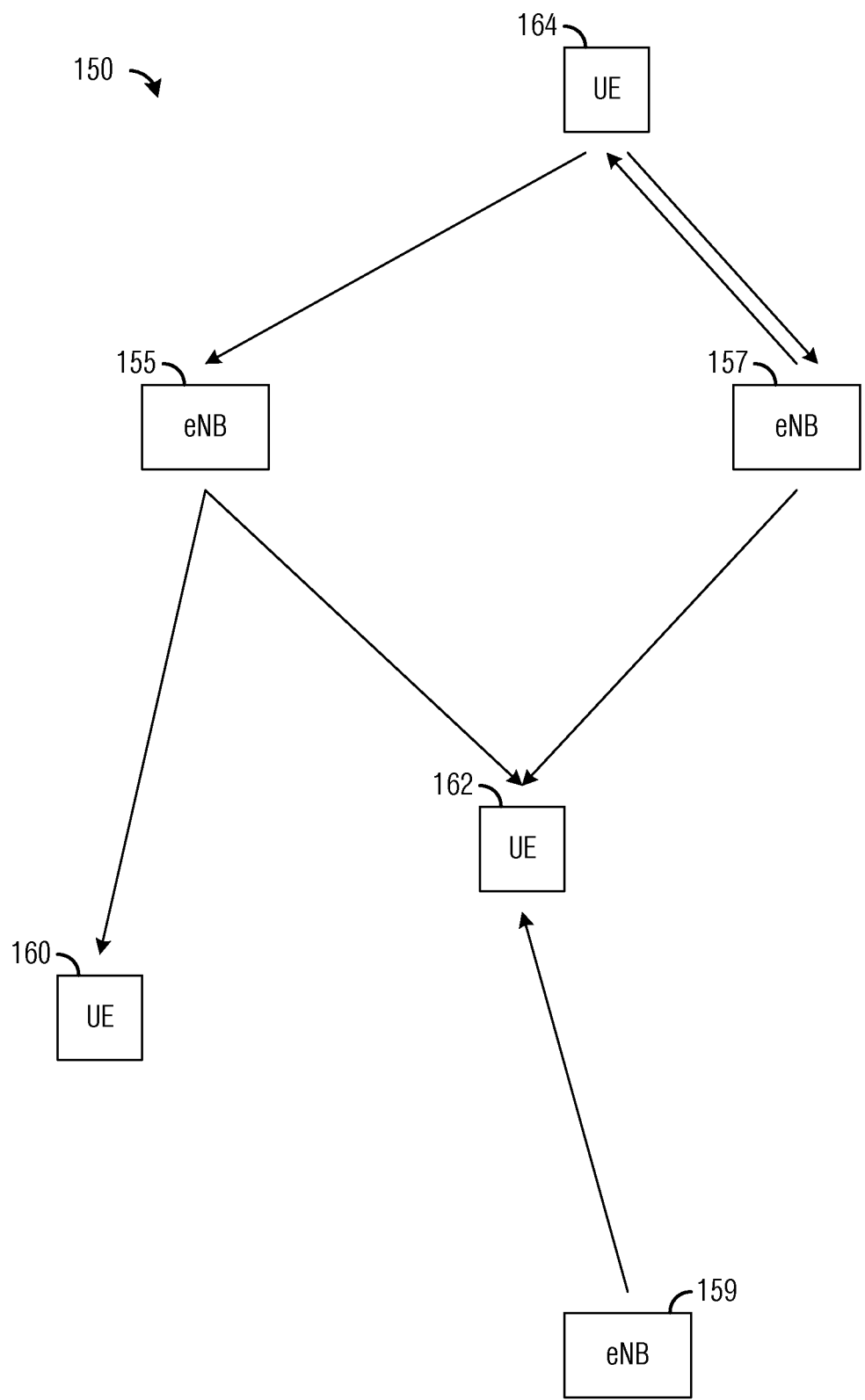
FIG. 1b illustrates an example communications system highlighting CA and/or CoMP operation according to example embodiments described herein.

FIG. 1b illustrates a communications system 150 highlighting CA and/or CoMP operation. Communications system 150 includes a plurality of eNBs, such as eNB 155, eNB 157, and eNB 159. Communications system 150 also includes a plurality of UEs, such as UE 160, UE 162, and UE 164. eNB 155 may transmit to UE 160, as does eNB 157 to UE 164. eNBs 155-159 may utilize CA and/or CoMP to transmit to UE 162, while UE 164 may utilize CA and/or CoMP to transmit to eNBs 155 and 157.

Figure 2A:
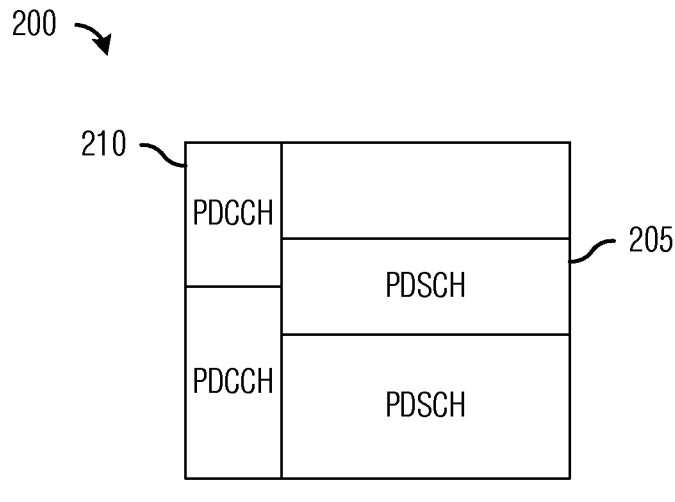
FIG. 2a illustrates an example downlink frame according to example embodiments described herein.
Figure 2B:
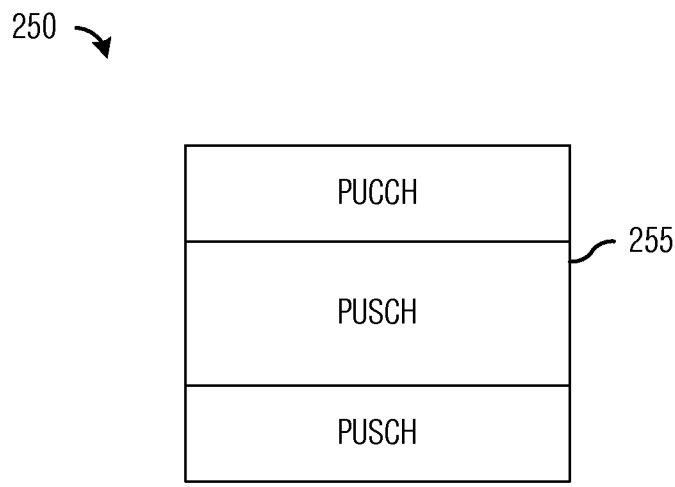
FIG. 2b illustrates an example uplink frame according to example embodiments described herein.

In an LTE compliant communications system, channels are allocated out of communications system resources for the purpose of transmitting packets from an eNB to a UE (a downlink transmission) or from a UE to an eNB (an uplink transmission). FIG. 2a illustrates a downlink frame 200. As shown in FIG. 2a, data channels for transmitting downlink data packets from an eNB to a UE in a physical layer are called physical downlink shared channels (PDSCH), such as PDSCH 205. Corresponding physical layer control channels from an eNB to a UE are called physical downlink control channels (PDCCH), such as PDCCH 210, and indicate the location (e.g., time, frequency, or time and frequency) of the PDSCH. FIG. 2b illustrates an uplink frame 250. As shown in FIG. 2b, data channels for transmitting uplink data packets from a UE to an eNB in a physical layer are called physical uplink shared channels (PUSCH), such as PUSCH 255. A PDCCH in a corresponding downlink frame also indicates the location of the PUSCH.

Hybrid automatic repeat request (HARQ) is a technique used in a LTE compliant communications system that allows a transmitting device to retransmit a packet if a receiving device fails to decode the packet. In general, the transmitting device applies a cyclic redundancy check (CRC) code to the transmission at a transport layer and transmits the packet in a PDSCH or a PUSCH. The receiving device sends back an acknowledgement (ACK) if a CRC check passes after it decodes the packet or a negative acknowledgement (NACK) if the CRC check fails. Typically, the transmitting device retransmits the packet if it receives a NACK.

In a situation when a UE (operating as a receiving device) fails to detect its PDCCH, the UE will not be able to receive a corresponding PDSCH as indicated in the PDCCH. The UE may send a discontinuous transmission (DTX). Furthermore, the UE does not know if a PDCCH is transmitted or not. If the UE correctly decodes its PDCCH, but it does not correctly decode the corresponding PDSCH, the UE may send back a NACK. The eNB (operating as a transmitting device) may retransmit the packet if the feedback from the UE is either a NACK or a DTX.

In a LTE-Advanced (LTE-A) compliant communications system, two or more component carriers (CC), which are basic packet carriers, may be aggregated (or combined) to support greater bandwidth transmissions. Each CC may have a bandwidth of 20 MHz. In LTE-A, there is an independent HARQ entity for each CC that generates an ACK/NACK feedback. Each HARQ entity has an associated downlink control channel (either a PDCCH or an enhanced PDCCH (EPDCCH)) to indicate information about a PDSCH resource allocation for the HARQ entity. In LTE-A, if the downlink transmission of the PDSCH of a UE is simultaneously scheduled on multiple downlink CCs, the ACK/NACK feedback for all of the downlink CCs may be transmitted on a single uplink CC. As an example, in FIG. 2b, PUSCH 255 may be used to transmit uplink ACK/NACK feedback.

Figure 3:
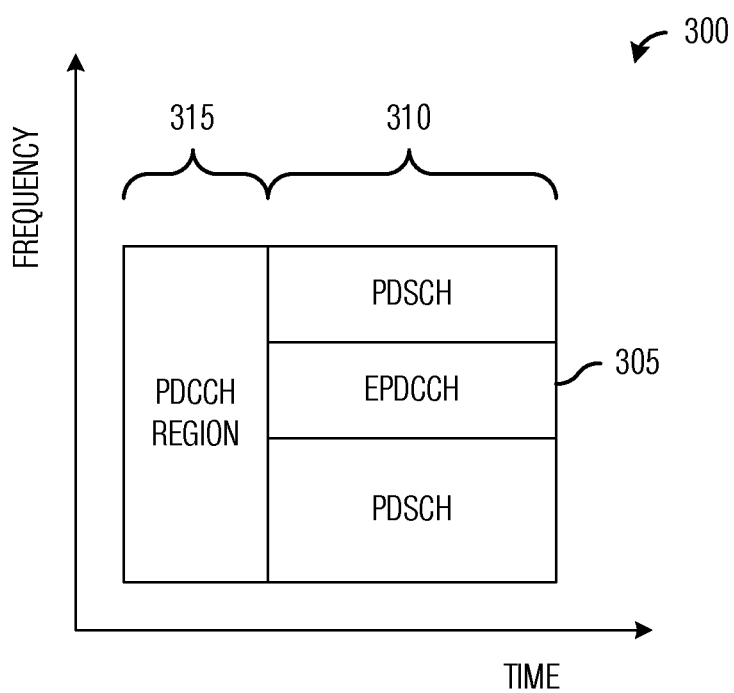
FIG. 3 illustrates an example downlink frame including an EPDCCH according to example embodiments described herein.

FIG. 3 illustrates a downlink frame 300 including an EPDCCH. As shown in FIG. 3, downlink frame 300 includes an EPDCCH 305 that may also be a downlink control channel with similar functionality as a PDCCH, but EPDCCH 305 may be located in a data region 310 of downlink frame 300 instead of being limited to being located in a control region 315 of downlink frame 300. Demodulation of an EPDCCH may be based on a demodulation reference signal (DMRS) rather than a common reference signal (CRS) based demodulation used for a PDCCH.

Figure 4:
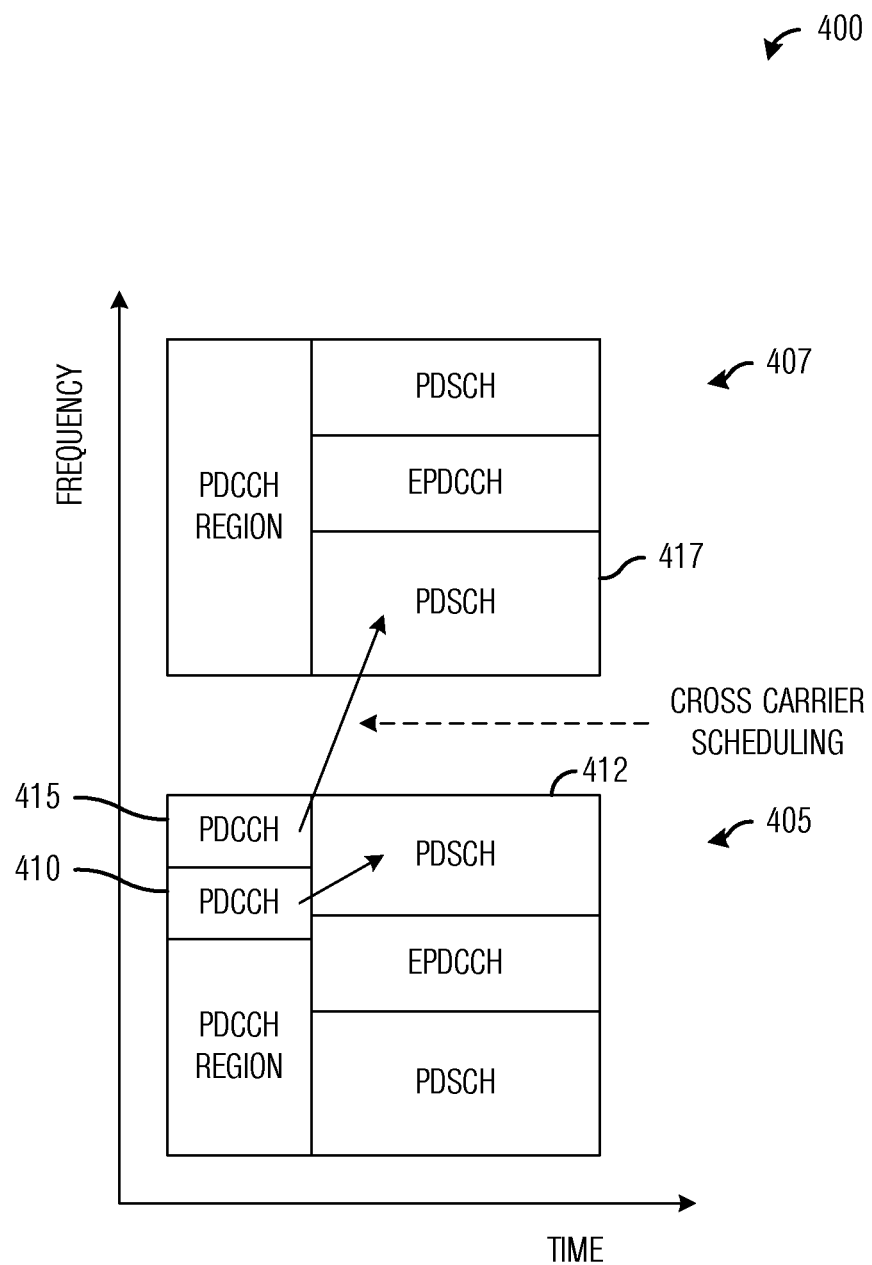
FIG. 4 illustrates an example diagram of downlink frames according to example embodiments described herein.

FIG. 4 illustrates a diagram of downlink frames 400. As shown in FIG. 4, downlink frames 400 includes first downlink frame 405 and second downlink frame 407. It may be possible for a PDCCH and/or an EPDCCH to indicate a PDSCH transmission in a component carrier that is different from a component carrier of the PDCCH and/or the EPDCCH. In other words, the PDCCH and/or the EPDCCH may be located in a component carrier that is different from a component carrier of the PDSCH and/or PUSCH that is indicated by the PDCCH and/or the EPDCCH. First downlink frame 405 may be located in a primary component carrier and includes a first PDCCH 410 that indicates a first PDSCH 412 that is also located in first downlink frame 405. First downlink frame 405 also includes a second PDCCH 415 that indicates a second PDSCH 417 that is located in second downlink frame 407, which is located in a secondary component carrier. The indication of a PDSCH and/or PUSCH located in a different component carrier may be referred to as cross carrier scheduling. According to 3GPP LTE Release-10 (Rel-10) technical specifications, a component carrier is referred to as a cell. When multiple cells are controlled by a single eNB, cross scheduling of the multiple cells may be implementable since there is a single scheduler located within the single eNB to schedule communications in the multiple cells.

In general, there is a separate HARQ process for each cell. There may be several techniques that may be used to transmit the multiple ACK/NACK feedback corresponding to the multiple separate HARQ processes. In a first technique, it may be possible to use format 1b with channel selection to transmit multiple ACK/NAC feedbacks, up to 4 bits. In a second technique, a Discreet Fourier Transform Spread Orthogonal Frequency Division Multiplexed (DFT-S-OFDM) based scheme (also referred to as format 3) may be used with a capacity of up to 10 bits for ACK/NACK feedbacks. In both techniques, the eNB may need to inform the UE about an ACK/NACK resource to be used for transmitting the multiple ACK/NACK feedbacks.

Figure 5A:
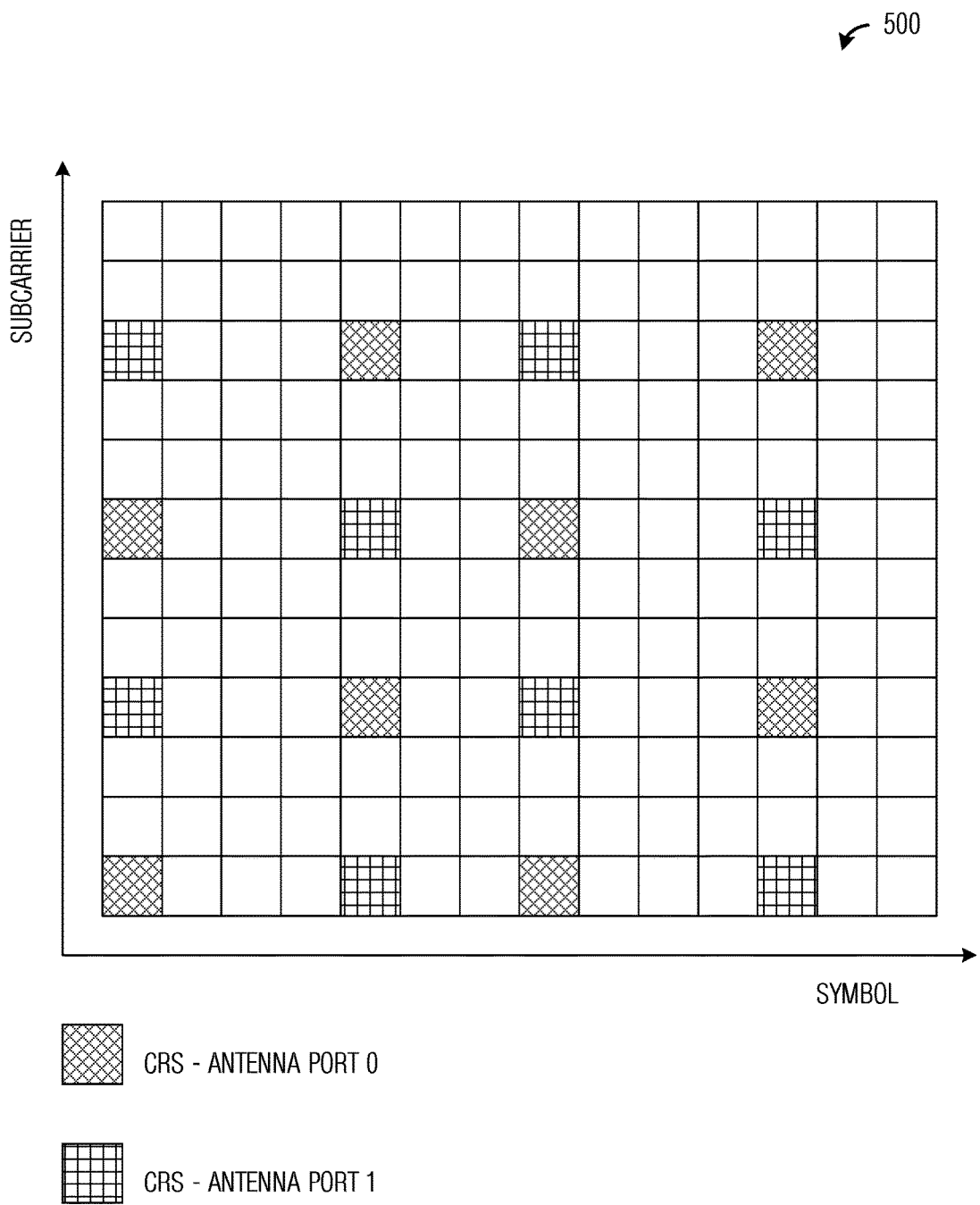
FIG. 5a illustrates an example resource block used in a downlink of an LTE compliant communications system according to example embodiments described herein.

FIG. 5a illustrates a resource block 500 used in a downlink of an LTE compliant communications system. Resource block 500 includes a reference signal, referred to as a common reference signal (CRS), which may be used by a UE to perform channel estimation for demodulation of a PDCCH, as well as other common channels. Resource block 500 illustrates possible CRS locations for two different antenna port configurations. The reference signal may be used for measurements and some forms of feedback.

Figure 5B:
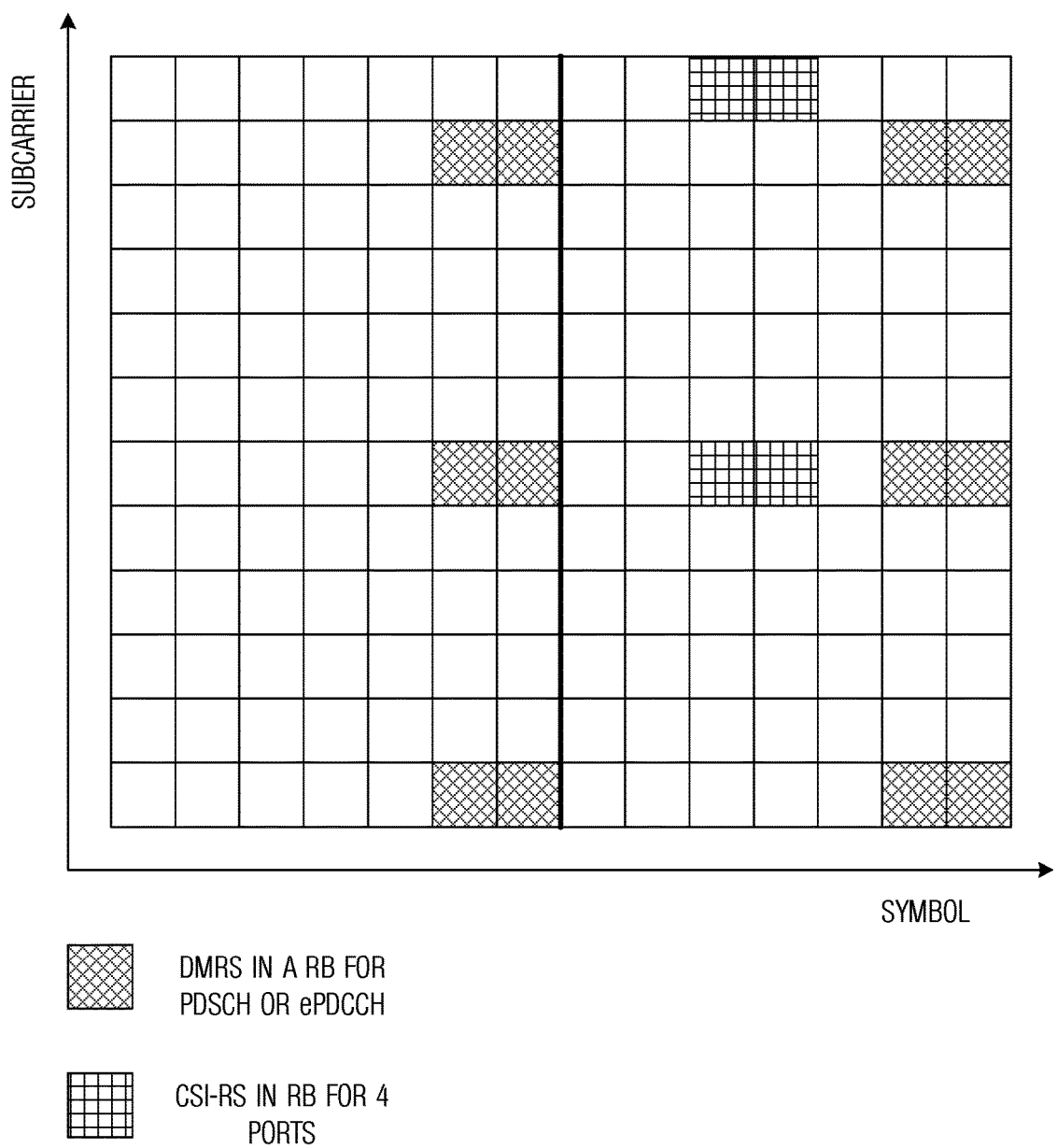
FIG. 5b illustrates an example resource block including a DMRS and a CSI-RS

A dedicated (or demodulation) reference signal (DMRS) may be transmitted together with a PDSCH in a Rel-10 compliant communications system. A DMRS may be used for channel estimation during PDSCH demodulation. A DMRS may also be transmitted together with an EPDCCH to be used by a UE for channel estimation of the EPDCCH. Additionally, a channel state information reference signal (CSI-RS) may be used by UEs to measure channel status, especially for multiple antenna deployments. As an example, measurements of the CSI-RS may be used to generate a precoding matrix indicator (PMI), a channel quality indicator (CQI), a rank indicator (RI), and the like. There may be multiple CSI-RS resources configured for a UE, therefore, there may be specific time-frequency resource and scrambling code(s) assigned by an eNB for each CSI-RS resource. FIG. 5b illustrates a resource block 550 including a DMRS and a CSI-RS. Resource block 550 includes a DMRS, and a CSI-RS for an antenna port 4 configuration.

Figure 6:
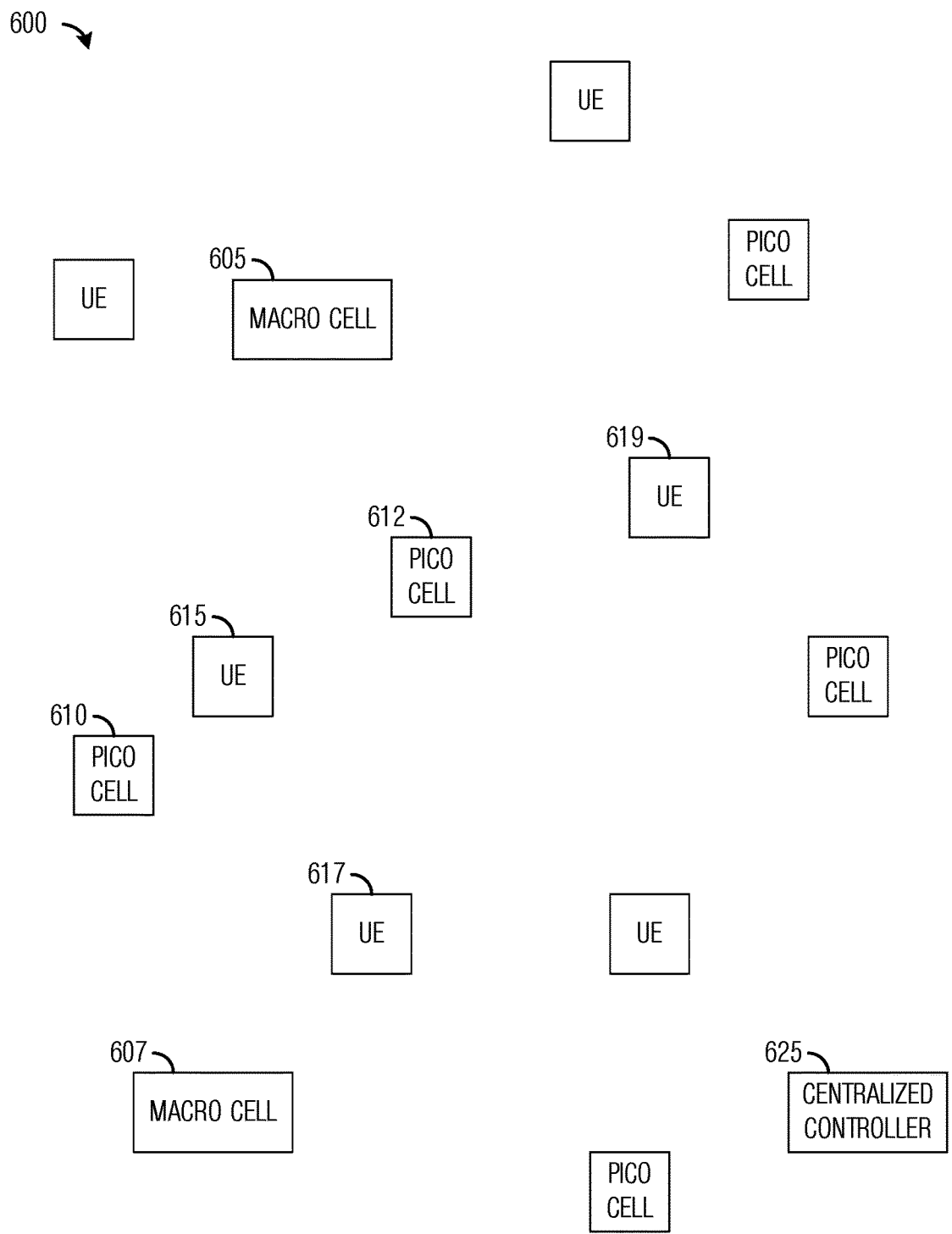
FIG. 6 illustrates an example communications system according to example embodiments described herein.

FIG. 6 illustrates a communications system 600. Communications system 600 may include macro cells, such as macro cell 605 and macro cell 607, and pico cells, such as pico cell 610 and pico cell 612. In general, a macro cell may be an eNB that is capable of transmitting at a maximum transmit power level of communications system 600, therefore, a macro cell may be described as a higher power node and/or antenna with larger coverage area. Typically, macro cells are deployed by a network operator and are part of a planned infrastructure. A pico cell, on the other hand, are normally lower powered cells and transmit at a fraction of the maximum transmit power level of communications system 600, therefore, a pico cell may be described as a lower power node and/or antenna with smaller coverage area. Pico cells may be deployed by the network operator to provide coverage in areas with weak signals or with high UE concentration. Pico cells may also be deployed by a subscriber of communications system 600 to help improve performance. The macro cells and the pico cells may serve UE, such as UE 615, UE 617, and UE 619. Communications system 600 may be referred to as a heterogeneous network (HetNet).

Communications system 600 may include a centralized controller 625. Centralized controller 625 may be a standalone entity in communications system 600 or it may be co-located with another device, such as an eNB. Centralized controller 625 may configure communications system resources for use in communications utilizing CA and/or CoMP. Centralized controller 625 may pass information about the configuration to an eNB and/or a UE that are communicating with one another. Centralized controllers, whether standalone entities or co-located with another device may be referred to as controller devices. The discussion presented herein focuses on an eNB performing the configuration of communications system resources for use in communications utilizing CA and/or CoMP. However, a standalone entity, such as centralized controller 625, may also perform the configuration of communications system resources.

As an illustrative example, in a 3GPP LTE compliant communications system, centralized controller 625 may be a standalone entity or it may be co-located with a macro eNB, a pico eNB, a controller of eNBs, a coordination server, a cluster center, a cluster head, and the like. Similarly, in a Universal Mobile Telecommunications System (UMTS) compliant communications system, centralized controller 625 may be a standalone entity or co-located with a radio network controller (RNC), while in an International Mobile Telecommunications-Multi-Carrier (IMT-MC) compliant communications system, also commonly referred CDMA2000, centralized controller 625 may be a standalone entity or co-located with a base station controller (BSC).

With CA, an eNB may operate and control several component carriers forming a primary cell (or primary component) and one or more secondary cells (or secondary components). In a 3GPP LTE Release-11 (Rel-11) compliant communications system, an eNB may control both a macro cell and a pico cell. In such a situation, a backhaul between the macro cell and the pico cell is a fast backhaul, meaning that information about the macro cell and the pico cell may be shared with very little latency. Such a backhaul may be referred to as a fast backhaul or an ideal backhaul. The eNB may be able to dynamically control the transmission and/or reception of both the macro cell and the pico cell. A PDCCH or an EPDCCH transmitted from the macro cell may be used to indicate a PDSCH and/or a PUSCH transmitted by the pico cell.

Typically, it may be possible to characterize a backhaul in accordance to a measure such as latency. As an illustrative example, a backhaul with a latency (one-way) of 5 milliseconds (ms) or greater may be considered to be a slow backhaul. Similarly, a backhaul with a latency (one-way) of 5 ms or less may be considered to be a fast backhaul. In addition to latency, throughput (in bits per second (bps), such as mega (M) or giga (G) bps) may also be used to categorize a backhaul. Table 1 illustrates the characterization of several example backhauls. It is also possible to characterize a backhaul based on a number that is relatively independent of prevailing technology. As an example, the latency of a backhaul may be expressed as a number of bits, symbols, frames, subframes, and the like, that may be transmitted. Utilizing the example provided above, it may be possible to characterize a backhaul as a fast backhaul if its latency is less than 5 subframes or as a slow backhaul if its latency is greater than 5 subframes. It is noted that the examples of 5 ms and/or 5 subframes are intended for discussion purposes only and not to be limits on the scope or spirit of the example embodiments.

TABLE 1

Example Backhaul Characterizations.

| Backhaul Technology | Latency (One-Way) | Throughput | Characterization |
|---|---|---|---|
| Fiber 1 | 10-30 ms | 10M-10 G bps | slow |
| Fiber 2 | 5-10 ms | 100--1000M bps | slow |
| DSL | 15-60 ms | 10-100M bps | slow |
| Cable | 25-35 ms | 10-100M bps | slow |
| Wireless | 5-35 ms | 10-100M bps | slow |
| Fiber 3 | 2-5 ms | 50M-10 G bps | fast |

However, in a 3GPP LTE Release-12 (Rel-12) and beyond compliant communications system, the backhaul between the macro cell and the pico cell may no longer be a fast backhaul. In other words, the backhaul may be a slow backhaul or a fast backhaul, which may be referred to as an "any backhaul". If the backhaul is a slow backhaul, a PDCCH or an EPDCCH transmitted by the macro cell generally cannot be used to indicate a PDSCH and/or a PUSCH transmitted from the pico cell since the information about the macro cell and the pico cell may not be shared in a sufficiently quick manner. As an example, if the latency of a backhaul is too great, the pico cell may not be able to share information about its available resources to the macro cell and the eNB in time for the eNB to perform cross carrier scheduling with a PDCCH or an EPDCCH transmitted by the macro cell indicating a PDSCH and/or a PUSCH transmitted from the pico cell.

In an actual HetNet deployment, there may be multiple macro cells and multiple pico cells operating in multiple component carriers. A backhaul connecting any two cells may be a fast backhaul or a slow backhaul depending on the cells and the deployment. According to an example embodiment, a system and method that enables diversified deployment and efficient communications is provided. In a situation when there is a fast backhaul between two cells, a technique that fully utilizes the fast backhaul is used to simplify communications between the cells and to improve coordination between the cells is used. In a situation when there is a slow backhaul between two cells, a technique that enables the communications to take place with the slow backhaul is used. In a HetNet deployment, the cells configured for a UE transmission or reception may include more than two cells, with backhauls between some pairs of cells being fast backhauls and backhauls between some other pairs of cells being slow backhauls.

Typically, an eNB may control one or more cells. Also, multiple remote radio units or remote radio heads (RRHs) may be connected to a single base band unit (BBU) of the eNB through an optical fiber cable, providing a low latency backhaul between the BBU and the RRHs. Therefore, the BBU may be capable of performing the coordination needed for transmission and/or reception of multiple cells to a UE. This type of communications is referred to as coordinated multiple point (CoMP) operation. When the coordination is performed a BBU to allow cells to transmit to a UE, then it is referred to as CoMP transmission. When the coordination is performed a BBU to allow cells to receive from a UE, then it is referred to as CoMP reception. When the BBU is connected to the cells through a fast backhaul, scheduling of PDSCHs transmitted in different cells to the UE can be readily coordinated by the BBU.

It is noted that in some configurations, a transmission point controlled by an eNB may not be a fully featured cell. Rather, the transmission point does not have the full functionality and/or features of a fully featured cell. As an example, a transmission point may not be transmitting broadcast channels. Such a transmission point may be referred to as a virtual cell since it may transmit PDSCH channels and/or EPDCCH channels, as well as other channels associated with a virtual cell identity signaled to a UE. A virtual cell identity is usually a value that may be used to generate a random scrambling sequence for a PDSCH, EPDCCH, and/or other channel just like a cell identity. As an example, a virtual cell identity may be a value between 0 and 503. As another example, an eNB may control and coordinate multiple fully featured cells to communicate with a UE. However, some of these fully featured cells may appear to the UE as virtual cells through the configuration and use of parameters, such as virtual cell identity, by a primary cell.

Normally, in CA, it may be assumed that an eNB controls the scheduling of PDSCHs in multiple component carriers. If the component carrier is a Rel-8 compatible component carrier, it may be a cell as defined in accordance with 3GPP LTE technical specifications. However, the component carrier may not be a Rel-8 compatible component carrier. In such a situation, the component carrier may be a virtual cell. Typically, an eNB may schedule PDSCH transmissions by multiple fully featured cells and/or virtual cells. A generalized cell may be used to refer to a fully featured cell or a virtual cell and a generalized cell identity may be used to represent an identity for a fully featured cell or a virtual cell.

Figure 7:
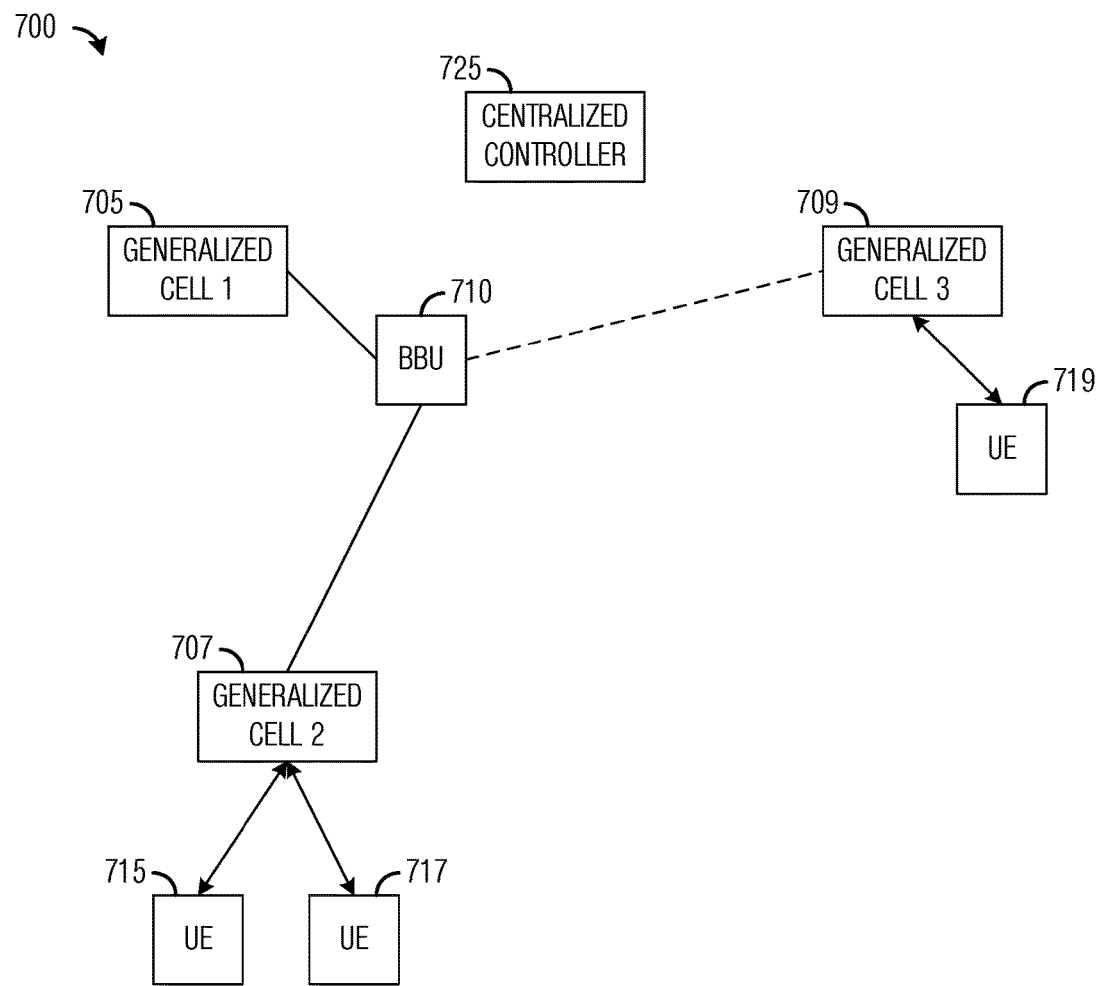
FIG. 7 illustrates an example communications system with generalized cells according to example embodiments described herein.

FIG. 7 illustrates a communications system 700 with generalized cells. Communications system 700 includes a plurality of generalized cells, such as generalized cell 705, generalized cell 707, and generalized cell 709. Generalized cells 705 and 707 may be connected to a BBU 710 through a fast backhaul, while BBU 710 is connected to generalized cell 709 through a slow backhaul. In general, a backhaul between generalized cells may be in the form of a generalized interface between resources of the generalized cells. As shown in FIG. 7, generalized cell 707 may be communicating with UEs 715 and 717, while generalized cell 709 may be communicating with UE 719. As shown in FIG. 7, generalized cell 705 may be a macro cell, generalized cell 707 may have a fast backhaul connection with generalized cell 705 since both are controlled by BBU 710. However, generalized cell 709 has a slow backhaul connection with generalized cell 705 and generalized cell 707. Communications system 700 may also include a centralized controller 725, which may be a standalone entity or co-located with another device, such as BBU 710, an eNB, and the like.

In order to simplify deployment, a backhaul for two generalized cells may be considered. The backhaul may have a large latency (a slow backhaul). As an example, if a generalized cell controlled by a first eNB has no fast backhaul link to a second generalized cell controlled by a second eNB, it may be difficult to perform dynamic coordinated scheduling between the first generalized cell and the second generalized cell. Hence, communications utilizing CA and/or CoMP as specified in Rel-11 may not be usable in such a situation. The cross carrier (or equivalently, cell) scheduling may not be supported for two component carriers without the presence of a fast backhaul. If the two generalized cells are connected by a fast backhaul, it may be possible to use the fast backhaul to perform the dynamic coordinated scheduling to use CA and/or CoMP to reduce the complexity of the communications and/or to improve the efficiency of the communications.

According to an example embodiment, realistic deployment requirements with slow backhauls and/or fast backhauls are met. Particularly, realistic deployment information about fast backhauls and/or slow backhauls may not be needed by UEs. In practice, the UEs may need to know communications system parameters that are used for communications with the UEs. As an example, although two or more generalized cells may be connected with a fast backhaul, it may be possible to use a technique that only requires a slow backhaul to facilitate communications with a UE using CA and/or CoMP. As an example, the use of a technique that requires only a slow backhaul may reduce hardware and/or software complexity in an eNB needed to support dynamic coordinated scheduling usually involved in techniques that require a fast backhaul to facilitate communications with UEs using CA and/or CoMP.

In Rel-10, CA has been considered with a limitation that multiple component carriers are controlled by a single eNB. Since an eNB may have a single media access control (MAC) entity that schedules transmission and/or reception of multiple component carriers, cross carrier scheduling may be supported for all component carriers configured for a UE if a single eNB controls all component carriers configured for the UE. In Rel-12 and beyond, carrier aggregation may utilize component carriers controlled by different eNBs. Therefore, different components with different eNBs may need to be considered. In other words, transmission cells or reception cells involved with CA may use different antennas and/or different component carriers. Furthermore, any two cells may be connected with a fast backhaul or a slow backhaul. Therefore, techniques that require dynamic coordinated scheduling may not be operable.

According to an example embodiment, communications system resources may be grouped according to backhaul characteristics of cells involved in communicating with a UE. Backhaul characteristics may include latency of a backhaul connection, a latency threshold of a backhaul connection, a latency range of a backhaul connection, a data rate of a backhaul connection, a bandwidth of a backhaul connection, and the like. As an illustrative example, a first set of communications system resources that is accessible for communications with a UE and is identified by a generalized cell identity (such as a cell-ID or a virtual cell-ID) may be configured into multiple communications system resource groups in accordance with the backhaul characteristics of cells involved. Within each communications system resource group, a set of second communications system resources may be configured to enable dynamic coordinated scheduling of DMRS of PDSCH and/or PUSCH, cross carrier scheduling, and the like. Examples of second communications system resources include channels, processes, and the like.

It may be possible to manage communications system resources to simplify communications system and/or UE operations while fully exploiting capabilities of the communications system when provided with a set of first communications system resources including fully featured cells (including primary cells and secondary cells as defined in conjunction with CA) and virtual cells (including a first communications system node that shares cell identity with a second communications system node in CoMP operation), as well as a set of second communications system resources (e.g., PDSCH, PDCCH and/or EPDCCH, PUSCH, PUCCH, and the like) associated with the fully featured cells and the virtual cells, and backhaul characteristics (including fast backhaul or slow backhaul) connecting the cells.

According to an example embodiment, an entity (such as a centralized controller, an eNB, and the like) may partition communications system resources belonging to a set of first communications system resources into a plurality of communications system resource groups and signals information about the set of first communications system resources (and hence the plurality of communications system resource groups) to a UE. The UE may utilize the information for signal processing purposes, such as transmitting, receiving, measuring, feeding back, and the like. Examples first communications system resources include CSI-RS, cells and/or points, PDSCH HARQ processes, channels (such as PDCCH and/or EPDCCH), DMRS, and the like. The signal processing performed for each group of communications system resources may be similar to legacy techniques such as CA and/or CoMP communications controlled by a single eNB, i.e., the CA and/or CoMP communications is performed by cells connected by a fast backhaul. However, signal processing may differ for different communications system resource groups.

Generally, in a communications system, there may be multiple fully featured cells, virtual cells, or a combination thereof, serving a UE. For each cell (either a fully featured cell or a virtual cell) there is a cell identity (cell-ID or virtual cell-ID). The cell identity may be used to generate a scrambling code for channels, such as a PDCCH and/or EPDCCH, PDSCH, PUSCH, and the like, or for generating the scrambling code for a DMRS of an EPDCCH or a DMRS of a PDSCH. For a virtual cell, such as a non-compatible point or a non-compatible component carrier, there may be signaling performed to inform the UE about the cell identity (a virtual cell-ID) to be used for generating a scrambling code of a channel, such as a PDCCH and/or EPDCCH, PDSCH, PUSCH, and the like, or for generating the scrambling code for a DMRS of an EPDCCH or a DMRS of a PDSCH. It is noted that in a situation where two or more generalized cell identities have the same value, there may be other parameters that may be used to differentiate the two generalized cells, such as the frequencies of the component carriers. As an illustrative example, two generalized cells in two different component carriers may have the same generalized cell identity values. Therefore, a generalized cell may be uniquely identified by its generalized cell identity value and its component carrier frequency, component carrier bandwidth, and the like. In the discussion presented herein, it is accepted that for simplicity reasons, there is a one to one correspondence between generalized cells and their generalized cell identities. However, it should be understood that information about the component carrier frequency, component carrier bandwidth, and the like, may also be used to uniquely specify a generalized cell. For each generalized cell, it may be assumed that there is a channel transmitted from the generalized cell or received by the generalized cell.

Figure 8A:
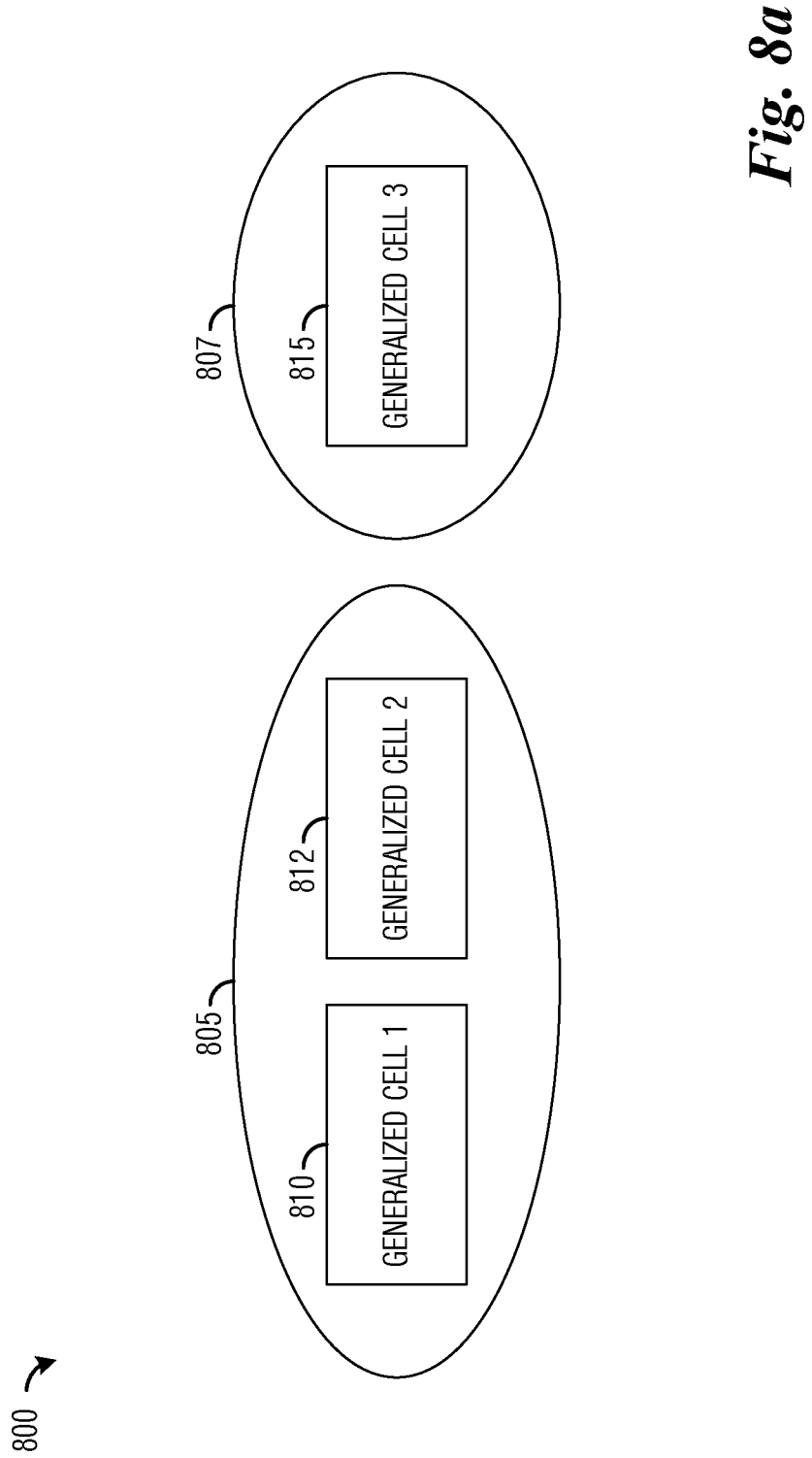
FIG. 8a illustrates an example communications system highlighting an example grouping of generalized cells according to example embodiments described herein.

FIG. 8a illustrates a communications system 800 highlighting an example grouping of generalized cells. Some of the generalized cells in communications system 800 may be grouped into two groups, a first communications system resource group 805 and a second communications system resource group 807. A device, such as a centralized controller or an eNB, may group communications system resources in communications system 800 in accordance with a backhaul characteristic(s) of backhauls connecting the generalized cells in communications system 800. As an illustrative example, generalized cell 810 and generalized cell 812 may be connected by a fast backhaul and therefore may be grouped together into first communications system resource group 805, while generalized cell 815 is connected to other generalized cells by a slow backhaul(s) and may be grouped by itself into second communications system resource group 807. The grouping may be performed for a set of first communications system resources, such as channels, cell identity, and the like.

Figure 8B:
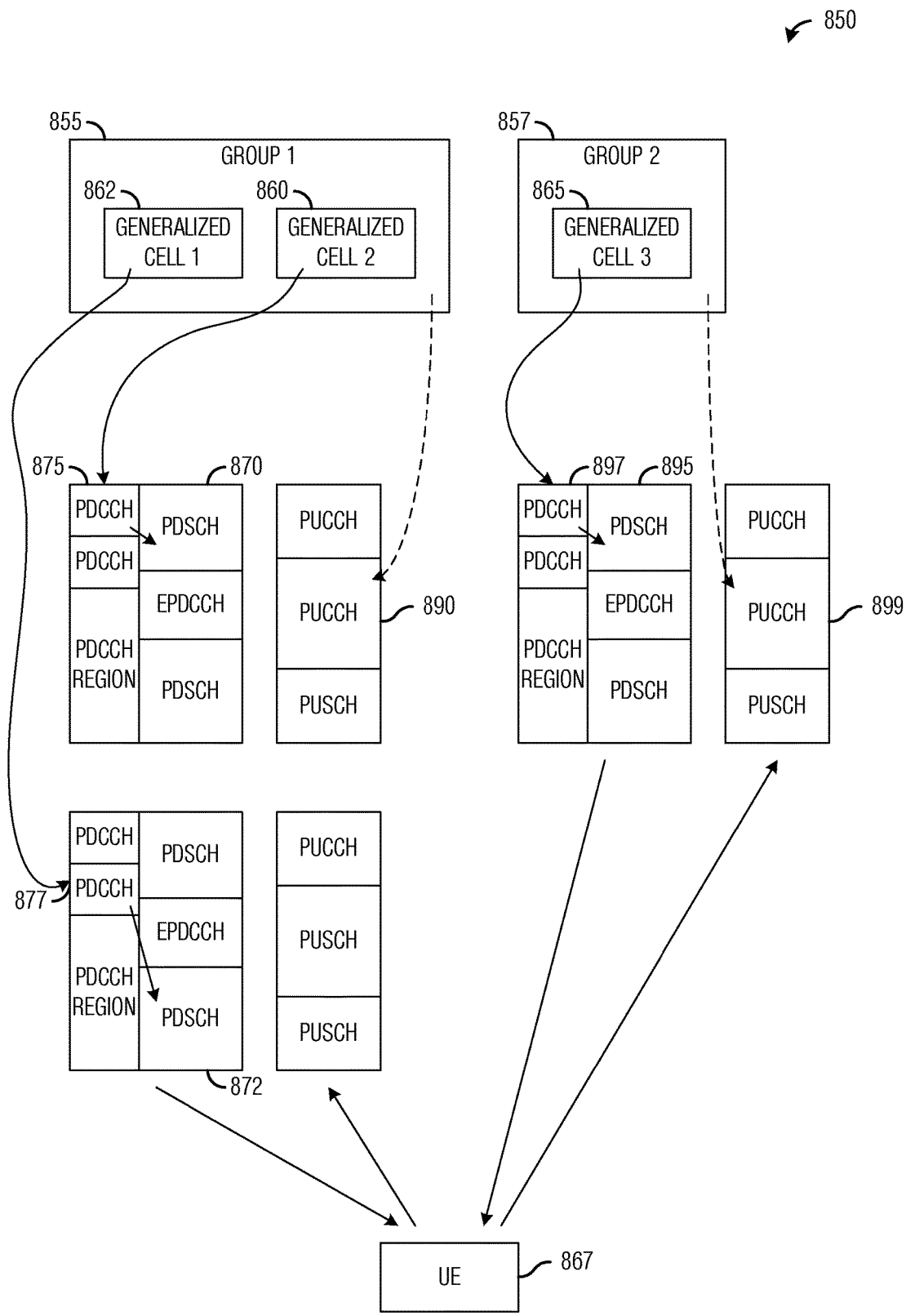
FIG. 8b illustrates an example detailed view of a grouping of communications system resources and the use of the communications system resource groups in supporting CA and/or CoMP communications according to example embodiments described herein.

FIG. 8b illustrates a detailed view of a grouping of communications system resources and the use of the communications system resource groups in supporting CA and/or CoMP communications. First communications system resources may be grouped into two communications system resource groups, communications system resource groups 855 and 857. In communications system resource group 855, there may be communications system resources in two different component carriers associated with generalized cell 860 and generalized cell 862, while in communications system resource group 857 there may be communications system resources associated with generalized cell 865. The communications system resources may be used to communicate with UE 867.

The first communications system resources in two different component carriers associated with generalized cell 860 may include a PDSCH 870 indicated by a PDCCH 875, while first communications system resources associated with generalized cell 862 may include a PDSCH 872 indicated by a PDCCH 877. Similarly, first communications system resources associated with generalized cell 865 may include a PDSCH 895 indicated by a PDCCH 897. For each communications system resource group, a set of second communications system resources may be configured. As shown in FIG. 8*b*, a set of second communications system resources associated with generalized cell 860 and generalized cell 862 may include a PUCCH 890, while a set of second communications system resources associated with generalized cell 865 may include a PUCCH 899.

Figure 9:
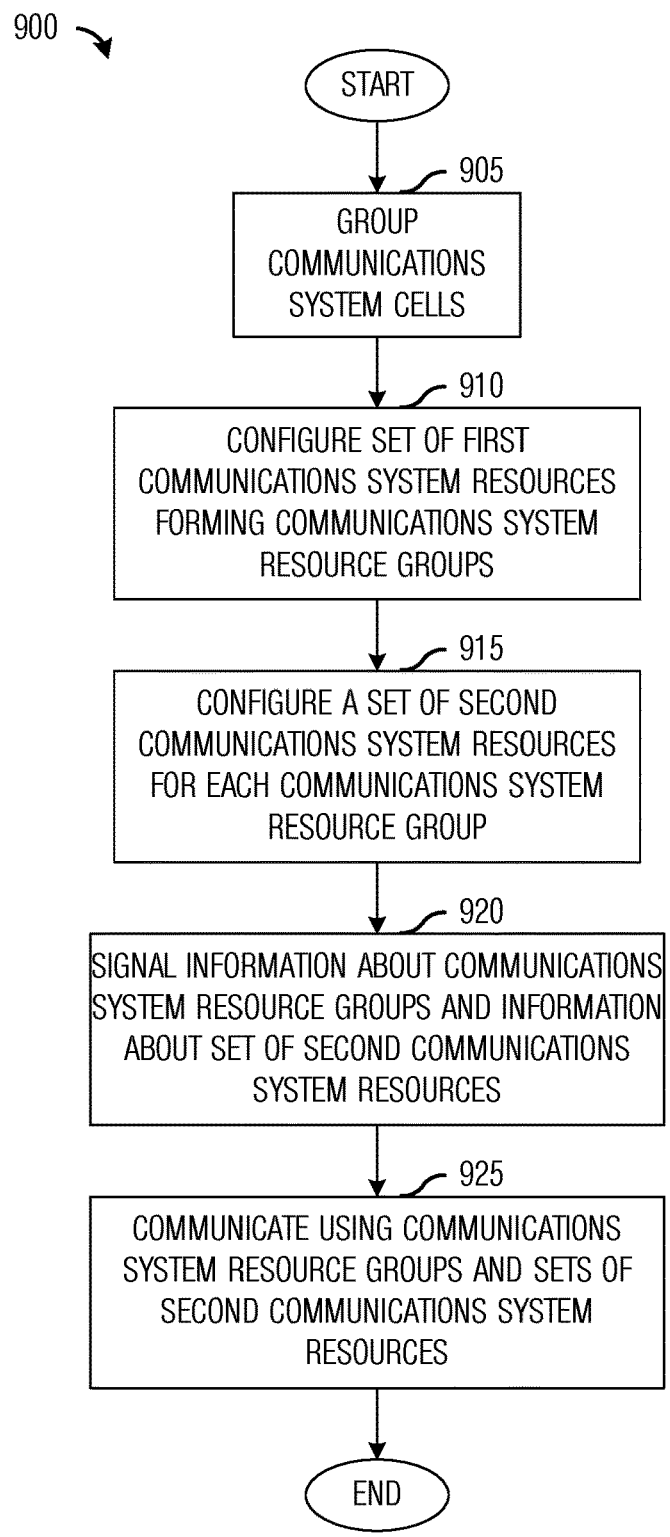
FIG. 9 illustrates an example flow diagram of operations occurring in a centralized controller as the centralized controller configures and/or communicates with a UE according to example embodiments described herein.

FIG. 9 illustrates a flow diagram of operations 900 occurring in a centralized controller as the centralized controller configures and/or communicates with a UE. Operations 900 may be indicative of operations occurring in a centralized controller, such as a standalone entity or co-located with another entity, as the centralized controller configures communications and/or communicates with a UE.

Operations 900 may begin with the centralized controller grouping cells of the communications system (block 905). The centralized controller may group cells of the communications system in accordance with backhaul characteristics of cells involved in the communications with the UE. Backhaul characteristics may include latency of a backhaul connection, a latency threshold of a backhaul connection, a latency range of a backhaul connection, a data rate of a backhaul connection, a bandwidth of a backhaul connection, and the like. Referencing FIG. 8*a* as an example, the centralized controller may group the generalized cells into two groups, with a first cell group including generalized cells 810 and 812 since generalized cells 810 and 812 are connected with a fast backhaul and a second cell group including generalized cell 815 since generalized cell 815 is connected to the other generalized cells with a slow backhaul.

Referencing back to FIG. 9, the centralized controller may configure (or specify) a set of first communications system resources in accordance with the cell groups to form communications system resource groups (block 910). The centralized controller may configure the set of first communications system resources, such as channels (e.g., PDSCH, PDCCH and/or EPDCCH, PUSCH, PUCCH, and the like), cell identity (e.g., cell-ID, virtual cell-ID, and the like), and the like, in accordance with the cell groups. As an illustrative example, the centralized controller may configure channels for each cell group, with the channels configured for each cell group being a communications system resource group. Referencing back to FIG. 8*a* as an example, the centralized controller may configure a channel(s) for each of the first cell group and the second cell group, producing communications system resource group 805 and communications system resource group 807.

Referencing back to FIG. 9, the centralized controller may configure (or specify) a set of second communications system resources for each communications system resource group (block 915). In general, the set of second communications system resources may be utilized by one of the participants in the communications with respect to (i.e., with) the first communication system resource group. As an example, if the set of first communications system resources are channels (e.g., PDSCHs), then the set of second communications system resources may be resources to allow a UE to transmit ACK/NACKs back to the cell(s) that transmitted data to the UE, where the data is transmitted by the channels (e.g., PDSCHs).

The centralized controller may signal information about the communications system resource groups and the sets of second communications system resources to the UE (block 920). As an example, the information regarding the communications system resource groups may be value(s) of the cell identities, locations of resources of channels, scrambling code identity or sequence identity of channels, and the like. Similarly, information about the sets of second communications system resources may be regarding locations of resources of channels, configurations of communication system resources, and the like. Alternatively, the centralized controller may provide the information about the communications system resource groups and the sets of second communications system resources to an eNB(s) participating in the communications with the UE and the eNB(s) may signal the information to the UE. The centralized controller (e.g., an eNB) communicates using the communications system resource groups and the sets of second communications system resources. The centralized controller and the UE may communicate using the communications system resource groups and the sets of second communications system resources (block 925). As an example, the centralized controller may transmit data to the UE using the communications system resource groups and the centralized controller may receive feedback (e.g., an ACK or NACK) that reflects the decoding of the transmitted data.

Figure 10A:
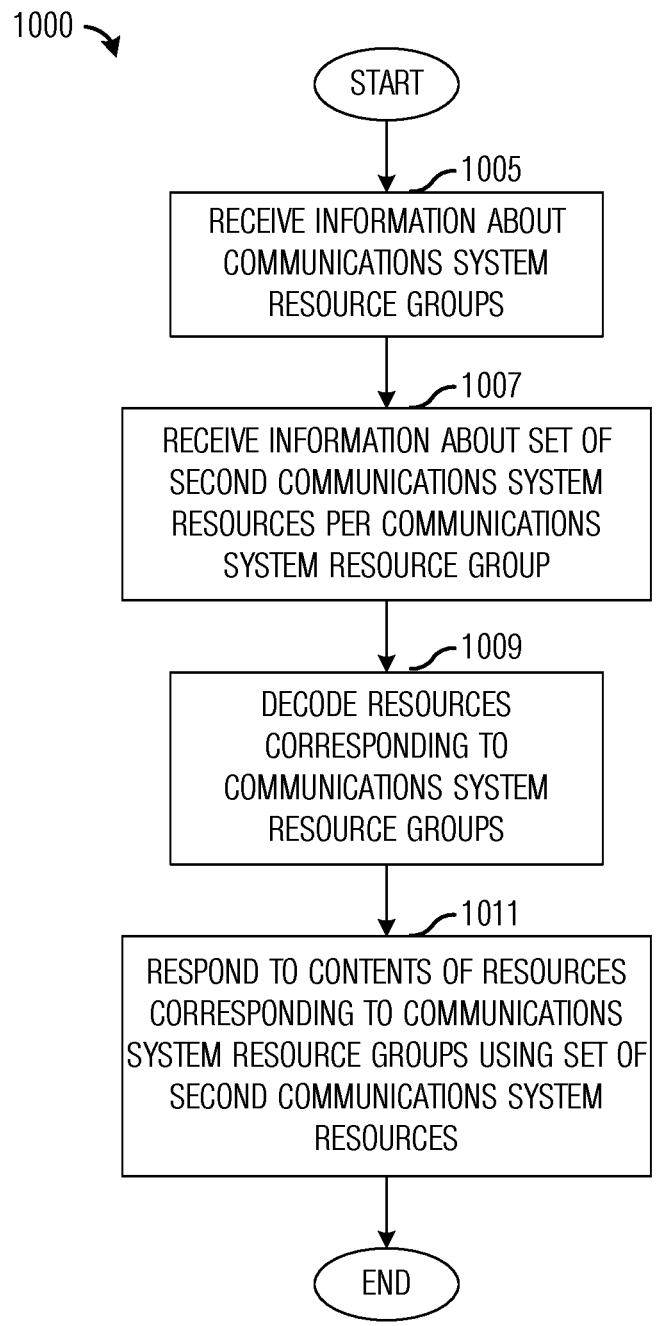
FIG. 10a illustrates an example flow diagram of operations in a UE as the UE communicates with an eNB, wherein the communications uses CA or CoMP according to example embodiments described herein.

FIG. 10*a* illustrates a flow diagram of operations 1000 in a UE as the UE communicates with an eNB, wherein the communications uses CA or CoMP. Operations 1000 may be indicative of operations occurring in a UE as the UE communicates with an eNB using CA and/or CoMP.

Operations 1000 may begin with the UE receiving information about communications system resource groups (block 1005). The UE may receive the information from a centralized controller. As discussed previously, the information about the communications system resource groups may inform the UE about a set of first communications system resources configured in accordance with backhaul characteristics of generalized cells involved with communications with the UE. The set of first communications system resources may include channels (e.g., PDSCH, PDCCH and/or EPDCCH, PUSCH, PUCCH, and the like), cell identity (e.g., cell-ID, virtual cell-ID, and the like), and the like. As an illustrative example, each of the communications system resource groups may specify a channel(s) for a generalized cell or a plurality of generalized cells that are connected with a fast backhaul. For discussion purposes, consider a situation as shown in FIG. 8*a*, where there are three generalized cells communicating with a UE. Generalized cells 810 and 812 are connected by a fast backhaul, while generalized cell 815 is not. Hence, a first communications system resource group may include resources for generalized cells 810 and 812 and a second communications system resource group may include resources for generalized cell 815. Therefore, the UE may receive information about the first communications system resource group and the second communications system resource group.

Referring back to FIG. 10*a*, the UE may receive information about a set of second communications system resources per communications system resource group (block 1007). The UE may receive the information from a centralized controller. As discussed previously, the set of second communications system resources may be associated with each communications system resource group and as an example, may be configured for dynamic coordinated scheduling of DMRS of PDSCH and/or PUSCH, cross carrier scheduling of PDSCH, by defining the downlink control information (DCI) in PDCCH and/or EPDCCH, and the like. Examples of second communications system resources include channels (e.g., PDCCH and/or EPDCCH, PUSCH, PUCCH, UE identity (e.g., UE-ID, virtual UE-ID, and the like), and the like), processes, and the like.

Figure 10B:
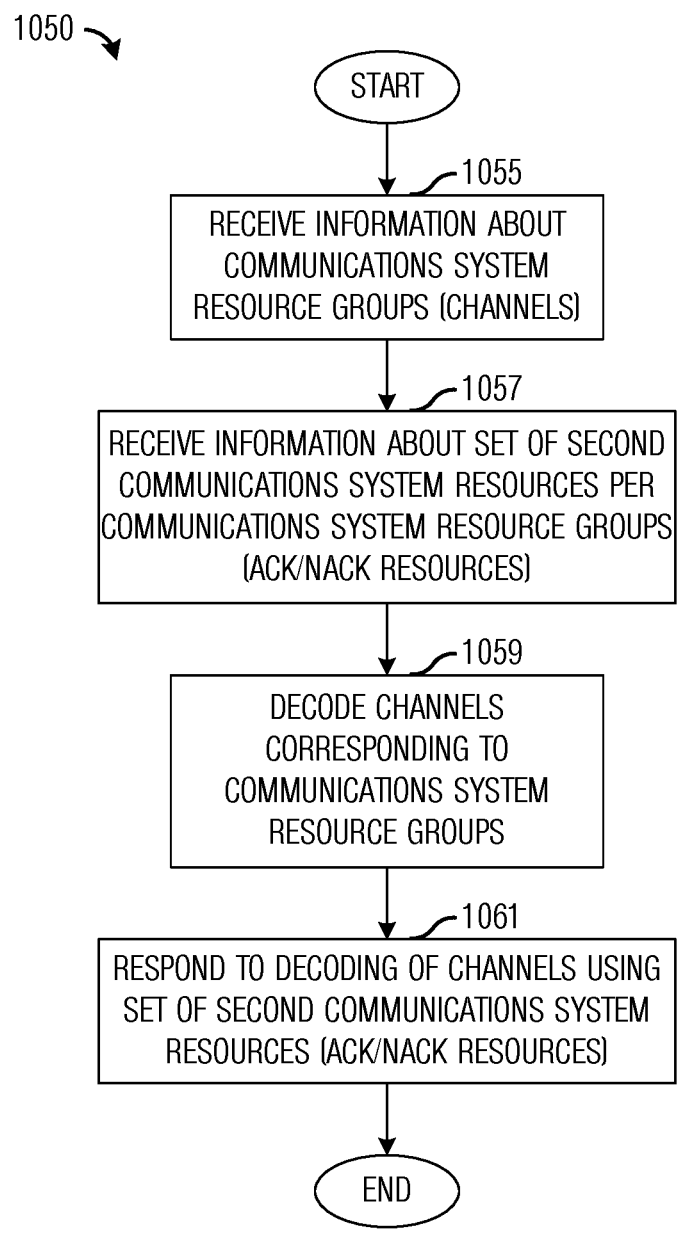
FIG. 10b illustrates an example flow diagram of operations in a UE as the UE communicates with an eNB over PDSCHs and PUCCHs, wherein the communications uses CA or CoMP according to example embodiments described herein.

The UE may decode resources that correspond to the communications system resource groups (block 1009). As an illustrative example, if the communications system resource groups comprise channels, the UE may decode the channels to determine information transmitted to it on the channels. For each channel that the UE decodes successfully, the UE may generate an ACK, while for each channel that the UE does not decode successfully, the UE may generate a NACK. As another illustrative example, if the communications system resource groups comprise cell identity, the UE may decode transmissions that are identified with the cell identity. The UE may respond to the contents of the resources that correspond to the communications system resource groups using the set of second communications system resources associated with each one of the communications system resource groups (block 1011). As an illustrative example, if the communications system resource groups comprise channels such as PDSCH and the sets of second communications system resources comprise channels such as PUCCH, the UE may feedback ACK/NACK information for transmissions received on the PDSCHs on the PUCCH FIG. 10b illustrates a flow diagram of operations 1050 in a UE as the UE communicates with an eNB over PDSCHs and PUCCHs, wherein the communications uses CA and/or CoMP. Operations 1000 may be indicative of operations occurring in a UE as the UE communicates with an eNB over PDSCHs and PUCCHs using CA and/or CoMP.

Operations 1000 may begin with the UE receiving information about channels (communications system resource groups), such as PDSCHs (block 1055). The UE may receive the information from a centralized controller. The PDSCHs may be used by groups of generalized cells to transmit to the UE using CA and/or CoMP. The UE may receive information about a channel(s) (i.e., PUCCHs as specified by a set of second communications system resources) per communications system resource group (block 1057). The UE may decode the PDSCHs in accordance with the information that it received about the channels (block 1059). For each channel that the UE decodes successfully, the UE may generate an ACK, while for each channel that the UE does not decode successfully, the UE may generate a NACK. The UE may respond to the decoding of the PDSCHs and/or contents of the PDSCHs using the PUCCHs (the set of second communications system resources per communications system resource group), by transmitting the ACKs and/or NACKs, for example (block 1061).

FIG. 11 illustrates communications system resources 1100. Communications system resources 1100 include a set of first communications system resources for generalized cells involved in CA or CoMP communications with a UE, including resources 1105 associated with a first generalized cell ("CELL 1") and resources 1107 associated with a second generalized cell ("CELL 2"). The set of first communications system resources include channels, cell identity, channels corresponding to a HARQ process in a cell. As shown in FIG. 11, the first generalized cell and the second generalized cell may have their own PDCCH and/or PDSCH, as well as a HARQ process. Communications system resources 1100 also include sets of second communications system resources, including resources 1110 associated with the first generalized cell and resources 1112 associated with the second generalized cell. As shown in FIG. 11, the sets of second communications system resources include PUCCH resources that may be used for ACK/NACK transmission or scheduling request (SR), PUSCH resources that may be used for aperiodic channel quality indicator (CQI) reports, and the like. It is noted that each set of second communications system resources is associated with a communications system resource group.

Figure 12:
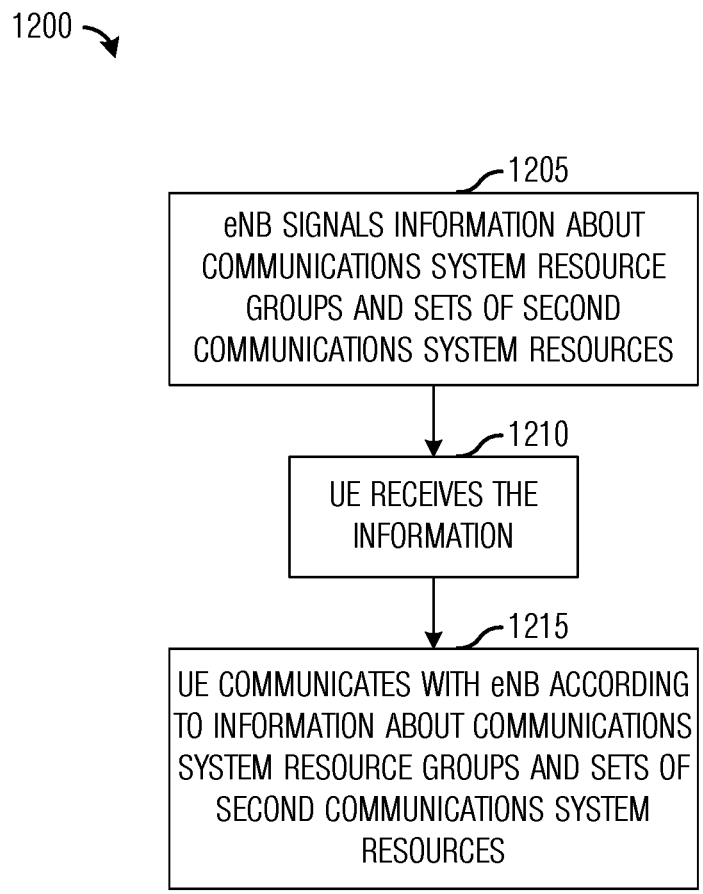
FIG. 12 illustrates an example flow diagram of operations involved in an interaction between an eNB and a UE as the UE participates in communications using CA or CoMP according to example embodiments described herein.

FIG. 12 illustrates a flow diagram of operations 1200 involved in an interaction between an eNB and a UE as the UE participates in communications using CA and/or CoMP. Operations 1200 may be indicative of operations occurring in an eNB and a UE as the UE participates in communications with the eNB using CA and/or CoMP.

Operations 1200 may begin with the eNB signaling information about communications system resource groups (e.g., groups of first communications system resources), such as generalized cell identifiers (e.g., cell identity, cell ID, virtual cell ID, and the like), channels, and the like to the UE (block 1205). As an example, the eNB may signal information about which generalized cell identifiers are within each communications system resource group. Since there are multiple communications system resource groups, the eNB may signal multiple groups of generalized cell identifiers.

The eNB may also signal information about sets of second communications system resources to the UE (block 1205). As an example, the second communications system resources may be generalized UE identity, such as UE ID, virtual UE ID, and the like, for each group of generalized cell identifiers. In other words, each group of generalized cell identifiers may be independently assigned a generalized UE identity. Typically, within each group of generalized cell identifiers, there may be a single generalized UE identity. The generalized UE identifier may be used by a channel that makes use of a scrambling code generated from the generalized cell identity. As an illustrative example, a PDCCH and/or EPDCCH associated with a generalized cell identity may use a corresponding generalized UE identity as a CRC mask (e.g., a 16-bit generalized UE identity may be added to a 16 bit CRC to generate a new CRC). It is noted that although at a high level, two generalized cell identifiers may have the same value, they are in fact different generalized cell identifiers when examined in detail since the two generalized cell identifiers correspond to resources transmitted on two different component carriers. As an alternative example, a search space of a PDCCH and/or EPDCCH may be determined by a generalized UE identity, where a search space is used for UEs to blindly detect candidate PDCCHs and/or EPDCCHs.

Therefore, for different communications system resource groups, the generalized UE identities may be independently configured, leading to flexibility to allocate the generalized UE identity within each communications system resource group. As an example, if two groups of communications system resources are connected by a slow backhaul, the configuration of the generalized UE identities may be performed independently within each group of communications system resources and there is no need for coordination between the two groups of communications system resources to avoid an allocation collision of the generalized UE identities (the same generalized UE identity allocated to each of the two groups of communications system resources).

Since coordination over a slow backhaul usually incurs higher overhead, larger latency, and increased complexity, it is typically not desirable. Therefore, generalized UE identity allocation without coordination may be beneficial. According to an example embodiment, within each communications system resource group, an eNB may readily coordinate generalized UE identity allocation without allocation collision since a fast backhaul is present. However, in a situation where only a slow backhaul is present, if a generalized UE identity of a first UE is allocated to a channel associated with a first generalized cell identity, the first generalized UE identity may have already been used by a second UE with another channel associated with a second generalized cell identity. Therefore, if the second generalized cell identity is added to a set of generalized cell identities for transmission to the first UE, the first generalized UE identity from the first generalized cell identity may not be usable in the generalized cell identity. However, with independent allocation of generalized UE identities, the allocation collision of generalized UE identities or signaling for cross coordination of generalized UE identities over a slow backhaul may be avoided or reduced. In general, when a generalized UE identity is allocated in a generalized cell, the generalized UE identity may be provided to other generalized cells if the other generalized cells need the information, to inform its own UEs, for example.

According to an alternative example embodiment, it may be possible to divide a set of generalized UE identities into subsets and each communications system resource group may assign a generalized UE identity to a UE from a separate subset without requiring coordination or close communications between the communications system resource groups since the subsets of generalized UE identities are disjoint. With this alternative example embodiment, a single UE identify can be configured across multiple communication system resource groups serving the UE without UE identify allocation collisions. This alternative example embodiment may require very little communications since the only communications required is to signal the subsets of generalized UE identities to the various communications system resource groups. This alternative example embodiment may introduce additional network planning of UE identities and may have the constraint of UE identity allocation in each of the communications system resource groups.

The signaling of the information about the communications system resource groups and/or the sets of second communications system resources may be performed through higher layer signaling, such as through radio resource control (RRC) signaling, or physical layer signal, or through Layer 1 and/or Layer 2 signaling carried in a physical control channel.

The UE may receive the information (block 1210). The UE may communicate with the eNB using resources in the communications system resource groups and the sets of second communications system resources (block 1215). As an example, the UE may use the resources to transmit information on an uplink channel(s), such as a PUSCH. The scrambling code for the uplink channel(s) may be derived from the generalized cell identity, as well as the generalized UE identity. As another example, the UE may receive information over resources of a downlink channel(s), such as a PDCCH and/or EPDCCH. Since the PDCCH and/or EPDCCH are scrambled using a scrambling code generated from a generalized cell identity, the UE may generate the scrambling code in accordance with the generalized cell identity, descramble received signals in the resources of the downlink channel(s), and decode the PDCCH and/or EPDCCH. The UE may also perform a CRC check using the generalized UE identity since the CRC bits are masked by the generalized UE identity obtained from the eNB. If the CRC check passes, the UE may decide if the decoding of the PDCCH and/or EPDCCH is correct and provide feedback (ACK/NACK) accordingly.

Figure 13:
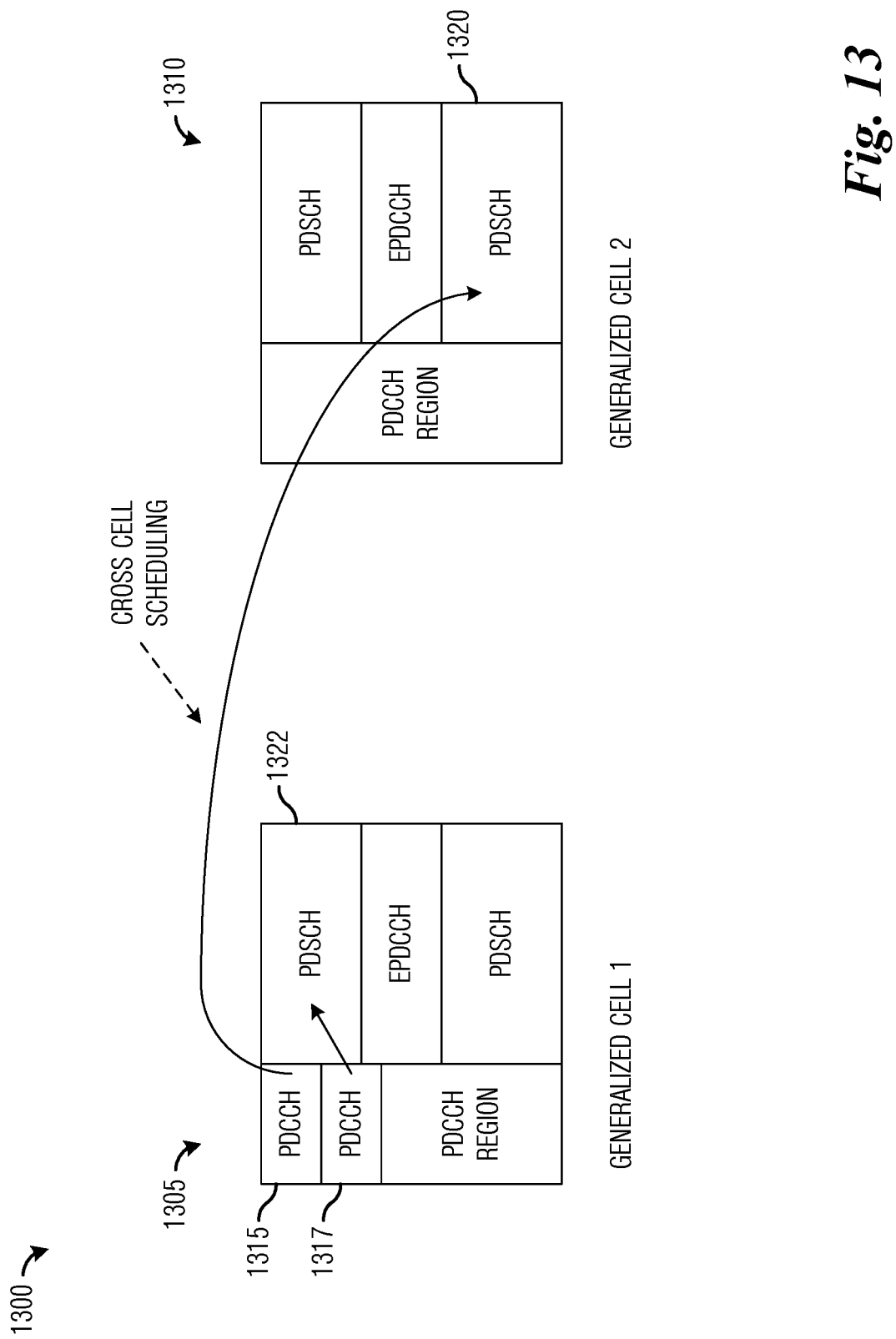
FIG. 13 illustrates an example diagram of resources highlighting cross cell scheduling according to example embodiments described herein.

FIG. 13 illustrates a diagram of resources 1300 highlighting cross cell scheduling. Resources 1300 include resources for a downlink subframe 1305 transmitted by a first generalized cell and a downlink subframe 1310 transmitted by a second generalized cell. In cross cell scheduling, an eNB may signal information about groups of generalized cell identities (an example of a set of first communications system resources) and cross cell scheduling information in a PDCCH and/or EPDCCH associated with each communications system resource group, with resources associated with the PDCCH and/or EPDCCH being the set of second communications system resources. Information about the cross cell scheduling may be about whether the cross cell scheduling for a PDCCH and/or EPDCCH is configured for a communications system resource group and/or which cell is selected as a primary generalized cell within the generalized cells, where the primary generalized cell within the generalized cells is a generalized cell that transmits a PDCCH and/or EPDCCH that schedules the primary generalized cell as well as other generalized cells. In other words, the PDCCH and/or EPDCCH is transmitted in resources of the primary generalized cell with scrambling codes generated from the generalized cell identity of the primary generalized cell. For each group of the first communications system resources, a cross cell scheduling configuration for PDCCH and/or EPDCCH is allowable, however, it doesn't mean the cross cell scheduling configuration is required. As shown in FIG. 13, the first generalized cell ("generalized cell 1") is the primary generalized cell, where a PDCCH 1315 schedules a PDSCH 1322 for the second generalized cell ("generalized cell 2") and a PDCCH 1317 schedules a PDSCH 1322 for the first generalized cell.

According to an example embodiment, the channels (or resources) associated with the generalized cell identities may be grouped according to groupings of the generalized cell identities. As an example, channels associated with a group of generalized cell identities may be grouped together. Examples of channels may be DMRS of EPDCCH, EPDCCH, PDSCH, DMRS of PDSCH, PUSCH, PUCCH, and the like. As specified in the 3GPP LTE and LTE-A technical specifications, generalized cell identity and/or generalized UE identity may be used in transmission channels, with the generalized cell identity and/or generalized UE identity typically being used to generate a scrambling code for the transmission channels.

According to another example embodiment, the channels (or resources) may be directly grouped into several groups. As an example, an eNB may signal grouping information for a channel type to a UE. In such a situation, channels may be the first communications system resources, with parameters of the channel being in the signaling about the first communications system resources. As an illustrative example, parameters to generate the scrambling codes for a channel such as a PDSCH may be one of the signaling about the first communications system resources. Furthermore, the parameters of the first communications system resources may be divided into several groups, with the information about the grouping of the parameters being signaled to the UE.

As an illustrative example, an eNB may signal grouping information about a PDSCH (an example of a first communications system resource) transmitted by communications system resource groups. Parameters may include a virtual cell identity used to generate the scrambling code of the PDSCH. The eNB may also signal an uplink ACK/NACK resource (an example of the second communications system resource) for each PDSCH group. Information about the uplink ACK/NACK resource may indicate a resource allocation of the second communications system resource. Within each PDSCH group, there may be multiple ACK/NACK resources allocated for transmitting the ACK/NACK feedback, but there may be a single ACK/NACK resource or area for transmitting one or more ACK/NACK feedback for one or more PDSCH for a single communications system resource group in a single subframe. As an example, the multiple ACK/NACK feedbacks may be jointly encoded and transmitted in an ACK/NAC resource in a subframe. The UE may receive one or more PDSCH and transmit the one or more ACK/NACK feedbacks (one per PDSCH) in one of the ACK/NACK resources signaled by the eNB for the PDSCH group. Using an ACK/NACK resource corresponding to a PDSCH group, the multiple ACK/NAC feedbacks may be jointly encoded and transmitted using Format 3 of Rel-11 technical specifications. Since a cell with a fast backhaul to other cells may dynamically control the scheduling information about PDSCHs within the same communications system resource group, the cell knows which ACK/NACKs are jointly encoded, as well as which information may be used for decoding the ACK/NACKs. However, if a slow backhaul is present, a cell may not be able to know whether or not another cell is scheduled to transmit a PDSCH. Therefore, the cell may not know the ACK/NACK information of other cells.

According to an example embodiment, the grouping of channels may be for any subset of PDCCH and/or EPDCCH, or DMRS of EPDCCH, or cells (which are examples of first communications system resources). For each communications system resource group, there may be a single scheduling request (SR) resource signaled to the UE. However, for different communications system resource groups, there may be different SR resources signaled to the UE. In such a situation, the SR resource is a second communications system resource. After the UE receives information about the generalized cell identities (an example of first communications system resources) and information about the SRs, for a group of the communications system resource, the UE may transmit a specific scheduling request in an uplink SR resource to trigger a specified cell to send an uplink grant signal for a PUSCH. In general, this may be required since different types of uplink data may be targeted for different reception groups. As an example, some uplink data comprises measurement reports targeting a specific group of cells that utilize such information for radio resource management, while other uplink data targets to other group of cells for more efficient utilization of radio resources. The eNB may specify the usage of scheduling resources associated with a group of cells for specific types of uplink data. Furthermore, for each group of cells, separate buffer status report (BSR) may be configured to enable appropriate scheduling of PUSCH transmissions targeting different groups of cells. In other words, the BSR for the group of cells is about specific types of uplink data for the group of cells.

According to an alternative embodiment, the first communications system resource may be a generalized cell identity and the second communications resource may be a signaling (or timing advance signaling). Timing advance signaling may be transmitted in MAC signaling. The timing advance signaling transmitted in the MAC signaling of any generalized cell within a group of generalized cells may be regarded as being valid. As an example, regardless of which generalized cell is used to transmit the timing advance signaling within the group of generalized cells, the UE may assume that the timing advance signaling may be applied for adjusting uplink transmission timing. There may be higher layer signaling used to inform the UE that one of the generalized cells may be as a generalized cell that specifically transmits the timing advance signaling. In such a situation, the other generalized cells in the group of generalized cells may not need to transmit the timing advance signaling. In a situation with multiple groups of generalized cells, higher layer signaling may be used to indicate which group of generalized cells is selected for informing timing advance signaling. Alternatively, there may be multiple timing advance signalings for different uplink transmission channels.

Once the UE receives the timing advance signaling, the UE may transmit an uplink channel, such as a PUSCH, with the timing adjusted in accordance with the timing advance signaling. The timing advance used for adjusting the uplink transmission timing may be the same as specified in Rel-11, for example. As an illustrative example, a downlink timing reference plus the timing advance may be used to determine the uplink transmission timing.

According to an alternative embodiment, the first communications system resource may be a generalized cell identity and uplink transmission power may be a second communications system resource. Signaling of the uplink transmission power may use uplink open loop power control parameters, such as Po and alpha (as defined in the 3GPP TS36.213 technical specifications, which is incorporated herein by reference), and closed loop transmission power commands (TPC). Within a group of generalized cells, the UE may assume that the parameters and the TPCs are valid and have the same value. Typically, the TPC is carried in a PDCCH and/or EPDCCH. If there are multiple PDCCHs and/or EPDCCHs to inform the same TPC transmitted by the eNB, the UE may use any one of the PDCCHs and/or EPDCCHs to obtain the TPC. Alternatively, one of the generalized cells in the group of generalized cells may be selected to transmit the TPC. In such a situation, the TPC bit(s) of other generalized cells may be reused for something else, such as to indicate the resource allocation of ACK/NACK resources. The UE may transmit uplink PUSCH and/or PUCCH at a power level as adjusted by the TPC.

FIG. 14 illustrates a diagram of resources 1400 highlighting a PUCCH, as well as a PUCCH embedded in a PUSCH. In general, the grouping of generalized cells in accordance with backhaul characteristics helps to resolve confusion which may arise when a UE is served simultaneously by a plurality of generalized cells that may be connected by either a fast back haul, a slow backhaul, or a combination thereof. It is noted that in Rel-8, Rel-9, Rel-10, and Rel-11 technical specifications, a UE may only be simultaneously served by a plurality of generalized cells connected by a fast backhaul. As an example, in Rel-8, periodic CSI reporting uses a PUCCH, and aperiodic CSI reporting uses a PUSCH. If a UE is not configured for simultaneous PUSCH and PUCCH transmission, it may perform periodic CSI reporting on a PUSCH of its serving cell with a smallest ServCellIndex in subframes with a PUSCH allocation, where the UE may use the same PUCCH-based periodic CSI reporting format on a PUSCH, which is defined in 3GPP TS36.213 technical specifications. However, the embedding of PUCCH content in a PUSCH is typically only applicable if both the PUCCH and the PUSCH are targeted for the same eNB or a plurality of generalized cells connected by a fast backhaul.

Suppose that a first generalized cell transmits a PDSCH to a UE and a second generalized cell receives a PUSCH from the same UE, with the first generalized cell connected the second generalized cell with any backhaul (either a fast backhaul or a slow backhaul). The UE may need to report ACK/NACK feedback and CSI in a PUCCH to the first generalized cell, which may coincide with a PUSCH transmission. However, in such a situation, it may not be preferred to embed the content of PUCCH in the PUSCH since they are targeted for different generalized cells not connected by a fast backhaul. Therefore, some portions of the LTE and/or LTE-A technical specifications may be adjusted to include the idea of a group. As an example, the PUCCH and PUSCH problem may be address as follows:

If a UE is not configured for simultaneous PUSCH and PUCCH transmission, it may transmit periodic CSI reporting or ACK/NACK feedback on PUSCH of its serving cell with smallest ServCellIndex (which is a severing cell identity as defined in the 3GPP technical specifications) in subframes with a PUSCH allocation within the same group generalized cells of the PUCCH transmission, where the UE may use the same PUCCH-based periodic CSI reporting format on the PUSCH as in the PUCCH.

According to an alternative embodiment, the first communications system resource may be a generalized cell identity or uplink PUCCH and/or PUSCH channels. Signaling information about the first communications system resource may be parameters used for the PUCCH and/or PUSCH transmission, such as a sequence group identity used for PUCCH transmission or a virtual cell identity used to generate a scrambling code for the PUCCH and/or PUSCH. The eNB may signal a UE about the grouping of the first communications system resources. As an example, the parameters of the first communications system resources may be divided into a plurality of parameter groups and information about the plurality of parameter groups may be signaled to the UE. The second communications system resource may be PUCCH and/or PUSCH resources, or the uplink control information (UCI) such as periodic CSI reports and/or ACK/NACK feedbacks. Signaled information about the second communications system resources may be whether a simultaneous transmission of PUCCH channel and PUSCH channel is configured per communications system resource group, or whether UCI is transmitted in PUCCH or in PUSCH when there is PUCCH and PUSCH collision. In other words, each communications system resource group may need to be signaled. Alternatively, information about the second communications system resource may be whether a simultaneous transmission of PUCCH channel and PUSCH channel is configured for all communications system resource groups. In other words, the signaling may be applied for all communications system resource groups.

The UE, in accordance with information about the communications system resource groups and information about simultaneous transmission of PUCCH and PUSCH, may decide whether the content of a PUCCH may be embedded into a PUSCH for transmission purposes. If simultaneous transmission of a PUCCH and a PUSCH is configured with a communications system resource group, the UE may transmit the PUCCH and the PUSCH simultaneously if they both are in the same communications system resource group. If simultaneous transmission of a PUCCH and a PUSCH is not configured with a communications system resource group, the UE may embed the content of PUCCH into the PUSCH to transmit if the PUCCH and the PUSCH are both in the same communications system resource group. The PUCCH will not be embedded into the PUSCH to transmit if the PUCCH and the PUSCH are both not in the same communications system resource group. If the PUCCH and the PUSCH are both not in the same communications system resource group, both the PUCCH and the PUSCH may both be transmitted or one of the two channels (either the PUCCH or the PUSCH) may be dropped based on UE capability and/or eNB configuration.

As shown in FIG. 14, CQI/ACK 1407 is the signaling embedded into PUSCH 1405 for transmission. If CQI/ACK 1407 is not embedded into PUSCH 1405, PUSCH 1405 and PUCCH 1410 may be transmitted simultaneously. If PUSCH 1405 and PUCCH 1410 are for different communications system resource groups of first communications system resources, there may be no fast backhaul between intended reception cells for PUSCH 1405 and PUCCH 1410, respectively, which means that it may be difficult to schedule resources for PUSCH transmission to ensure resources for both PUSCH 1405 and PUCCH 1420 are orthogonal at the reception cells. In such a situation, if the content of PUCCH is embedded (i.e., CQI/ACK 1407) in PUSCH 1405 for transmission, the signaling of CQI/ACK 1407 may be interfered with at the reception point. Therefore, in situations with different communications system resource groups, embedding is not used.

According to an alternative embodiment, each communications system resource group may be implicitly formed. As an example, a primary cell of a UE may configure additional communications system resources to the UE. These additional communications system resources may include a secondary component carrier, a virtual cell on the primary cell, a secondary carrier in the form of a virtual cell identity for scrambling of data transmissions and associated reference signals, a non-compatible carrier or cell, and the like. The additional communications system resources and the resources associated with the primary cell may form a communications system resource group within which transmission and/or receptions to and/or from the UE may be closely linked. As another example, cross carrier and/or cross cell scheduling may be enabled to schedule downlink and/or uplink data transmission from one carrier or cell to another carrier or cell through dynamic indication of transmission carrier and/or scrambling parameters within the communications system resource group. As another example, there is a single ACK/NACK resource or area for transmitting one or more ACK/NACK of one or more PDSCH within the communications system resource group.

Another primary cell may be added or activated for the UE to form a new communications system resource group. As an example, a UE may be first associated with a macro cell and a pico cell which is not connected to the macro cell through a fast backhaul may be subsequently added. When adding the pico cell as a communications resource for the UE, signaling may be needed to indicate that it is a cell that is not part of a communications system resource group that contains the primary cell. The newly added cell may become another primary cell which may configure more resources and/or cells to form another communications system resource group. Among the multiple primary cells, a single primary cell may become a lead primary cell or an anchor cell for functionalities such as mobility management, key generation for encryption purposes, major RRC connections, and the like.

Figure 15:
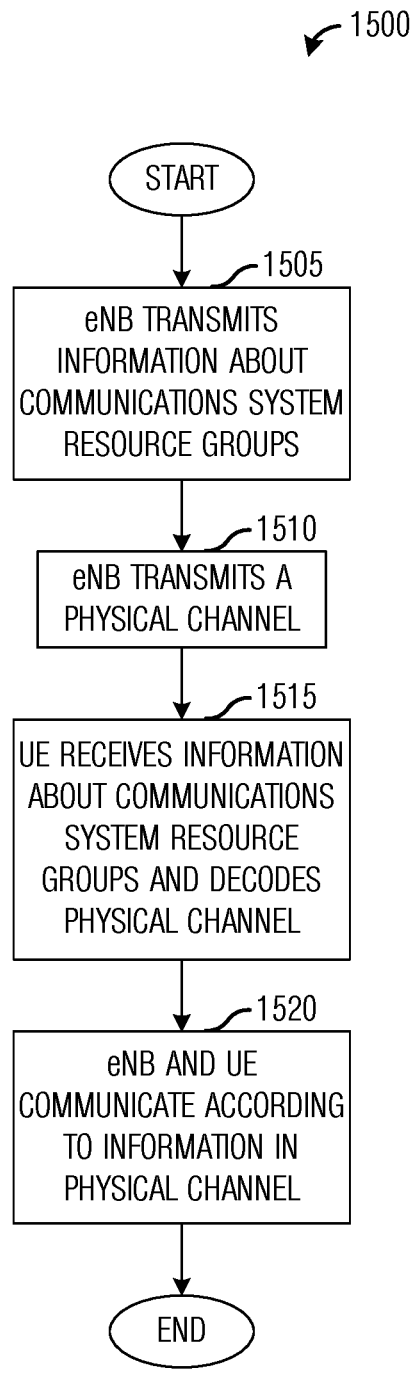
FIG. 15 illustrates an example flow diagram of operations involved in an interaction between an eNB and a UE as the UE participates in communications using CA or CoMP and the eNB signals information about the communications using higher layer signaling

FIG. 15 illustrates a flow diagram of operations 1500 involved in an interaction between an eNB and a UE as the UE participates in communications using CA and/or CoMP and the eNB signals information about the communications using higher layer signaling. Operations 1500 may be indicative of operations occurring in an eNB and a UE as the UE participates in communications using CA and/or CoMP and the eNB signals information about the communications using higher layer signaling.

Operations 1500 may begin with the eNB transmitting information about communications system resource groups using higher layer signaling (block 1505). The communications system resource groups may comprise groupings of first communications system resources, such as channels, generalized cell identity, and the like, in accordance with backhaul characteristics. For each communications system resource group (of generalized cell identities, for example), a set of scrambling codes of DMRS of a PDSCH or a PUSCH may be determined according to a rule predefined by a technical specification and/or by higher layer signaling. As an example, the scrambling codes of DMRS of a PDSCH corresponding to a generalized cell identity "X" may be a subset of all scrambling codes of DMRS of a PDSCH derived from the generalized cell identities within a single generalized cell identity group that includes the generalized cell identity "X". In general, the generalized cell identity "X" may be any valid generalized cell identity. The subset of all scrambling codes may be configured by using higher layer signaling, such as UE dedicated RRC signaling. As an example, a bit map method may be used to inform which scrambling codes form the subset of all scrambling codes.

The eNB may transmit a physical channel (block 1510). The physical channel may be a PDCCH and/or an EPDCCH that carries an indicator of information about the scrambling code for a PDSCH or a PUSCH. For a transmission of a PDCCH and/or an EPDCCH that is associated with the generalized cell identity "X", there may be signaling in the PDCCH and/or EPDCCH to indicate which one from the set of scrambling codes is chosen for the DMRS of the PDSCH or PUSCH scheduled by the PDCCH and/or EPDCCH.

The UE may receive information about the communications system resource groups and the PDCCH and/or the EPDCCH (block 1515). The UE may correctly interpret the indicator of information about the scrambling code in the PDCCH and/or EPDCCH (also block 1515). As an example, the UE may determine the set of scrambling codes for each communications system resource group, and based on a selecting signaling in the PDCCH and/or EPDCCH, the UE may determine which scrambling code is selected by the PDCCH and/or EPDCCH.

The eNB and the UE may communicate in accordance with information contained in the PDCCH and/or EPDCCH (block 1520). As an example, the UE may receive a DMRS of PDSCH indicated by the PDCCH and/or EPDCCH. As another example, the UE may transmit a DMRS of PUSCH as indicated by the PDCCH and/or EPDCCH using a scrambling code as indicated by information in the PDCCH and/or EPDCCH.

According to an alternative embodiment, in block 1505 the first communications system resource may be a generalized cell identity, then a set of sequence groups for an uplink DMRS(s) in accordance with a communications system resource groups (e.g., a group of generalized cell identities) based on a predefined rule and/or higher layer signaling, which may be the sequence groups derived from a subset of generalized cell identities within the same group of generalized cell identities that contains generalized cell identity "X".

Furthermore, in block 1510 signaling in the PDCCH and/or EPDCCH may be used to indicate which one (scrambling code) is chosen for the DMRS of the PUSCH of the UE. In block 1515 the UE may receive information about the generalized cell identity and the PDCCH and/or EPDCCH. The UE may interpret sequence group indicator information about the DMRS. In block 1520 the UE may transmit the uplink DMRS using the sequence of the sequence group that is signaled to the UE. The usage of the sequence group of DMRS may be similar to one as defined in LTE-A.

According to an alternative embodiment, in block 1505 information about the communications system resource groups may be groups of parameters of a DMRS of a PDSCH or groups of a DMRS of a PUSCH. The parameter may be used to determine the scrambling code of the DMRS of the PDSCH or may be used to determine the sequence group of the DMRS of the PUSCH. The eNB may signal information about which parameters are in a single group and there may be multiple groups of parameters for signaling.

In block 1510, the eNB may transmit control channels to the UE, such as a PDCCH and/or EPDCCH channel. For each control channel, there may be a group of parameters to which the control channel associates. For each generalized cell there is a predefined PDCCH and/or EPDCCH and/or there may be signaling to inform the UE information about the control channels. There may be signaling in the PDCCH and/or EPDCCH to select a parameter from a group of parameters about DMRS related with the PDCCH and/or EPDCCH. A signaling format used in the PDCCH and/or EPDCCH may be defined in a technical specification.

In block 1515, the UE may receive information about the communications system resource groups, which comprises information about the parameters of the DMRS. The UE may decode the PDCCH and/or EPDCCH. It is noted that a signaling format of the PDCCH and/or EPDCCH may be defined in a technical specification, and a corresponding relationship between a PDCCH and/or EPDCCH and a respective parameter group of the DMRS may be defined in a technical specification and/or signaled by higher layer signaling. As an example, the signaling format and the corresponding relationship may be associated with a generalized cell identity. The UE may know the parameter group for each PDCCH and/or EPDCCH. The UE may interpret the signaling for an uplink transmission or a downlink reception based on the selecting information in the PDCCH and/or EPDCCH. In block 1520, the UE may transmit the DMRS or receive the DMRS in accordance with the signaling in the PDCCH and/or EPDCCH.

The grouping of generalized cell identities and the grouping of parameters of the DMRS may be performed separately. In other words, it may be possible to have two separate signaling of information, one for the grouping of generalized cell identities and one for the grouping of parameters of the DMRS. The separate signaling of information may be beneficial in CoMP operation since the DMRS may be configured with a cell outside of a set of current serving generalized cells. Hence, there is additional flexibility to configure the set of DMRS for dynamic changing. In another aspect, if two generalized cells are in two different component carriers, there may be no need for a UE to dynamically change the DMRS between the DMRS of the two generalized cells since the DMRS are always orthogonal in the frequency domain. Therefore, the grouping of the DMRS may be related with whether two generalized cells are operating in the same frequency, which is another reason for separately grouping generalized cell identities and DMRS.

According to an alternative embodiment, communications system resource groups may be CSI-RS resources and/or CRS resources. In block 1505, an eNB may signal information about the communications system resource groups of CSI-RS and/or CRS resources to a UE, where examples of the information may be parameters about groupings of CSI-RS and/or CRS resources. The CRS resource may be used for CQI measurements. As an example, some cells may be configured with CRS resources for measurement, while some others may be configured with CSI-RS resources for measurement.

In block 1510, a control signal, such as a PDCCH and/or EPDCCH, may be a trigger for an aperiodic CQI report. For each communications system resource group of CSI-RS and/or CRS resources, there may be a trigger control channel, such as a PDCCH and/or EPDCCH, operating as a trigger for a single aperiodic CQI feedback. In order for a PDCCH and/or EPDCCH to trigger an aperiodic CQI feedback, there may be a bit field to indicate which CSI-RS and/or CRS resource(s) is requested to be used for the aperiodic CQI feedback. However, for different communications system resource groups of CSI-RS and/or CRS resources, the trigger control channel may be different. In other words, the trigger control channel may be configured independently for different communications system resource groups. The configuration of a PDCCH and/or EPDCCH for aperiodic CQI feedback may be defined in a technical specification or signaled to the UE. As an example, the PDCCH and/or EPDCCH may be transmitted by a primary generalized cell in each group of generalized cells associated with the communications system resource groups (for example, the PDCCH and/or EPDCCH may be transmitted by generalized cells that are associated with the CSI-RS and/or CRS resource(s)), where the primary generalized cells may be cells within each group of generalized cells with smallest generalized cell identity, defined by a rule, or signaled to the UE through higher layer signaling.

In block 1515, the UE may decode the PDCCH and/or EPDCCH according to information received about the communications system resource groups to trigger an aperiodic CQI report. Since the UE knows the information about the communications system resource groups, and for each communications system resource group there may be a PDCCH and/or EPDCCH to dynamically indicate which CSI-RS and/or CRS measurement to report, the signaling format in the PDCCH and/or EPDCCH to indicate which CSI-RS and/or CRS is chosen may be defined in a technical specification. Hence, the UE knows how to decode the PDCCH and/or EPDCCH to trigger the aperiodic CQI report.

In block 1520, the UE may transmit the CQI report of a CSI-RS and/or CRS resource as indicated by the PDCCH and/or EPDCCH. It is noted that signaling pertaining to grouping of generalized cell identities and signaling pertaining to communications system resource groups of CSI-RS and/or CRS resources may be performed separately. Even for a one generalized cell group, multiple CSI-RS and/or CRS resources may be configured to provide a flexibility to use transparent CoMP transmission. The UE may not need to distinguish different cells as different generalized cells since a single generalized cell identity may be configured for a set of generalized cells. The grouping of CSI-RS and/or CRS resources may be configured as a measurement set for CSI feedback associated with a group of generalized cell identities. Multiple measurement sets for CSI feedback may be configured. Further configuration of each CSI feedback (either aperiodic or periodic) may need to indicate a CSI-RS and/or CRS resource from a measurement set of resources. An appropriate PUCCH (for periodic feedback) or PUSCH (for aperiodic feedback or periodic feedback embedded in a PUSCH) may need to be informed to the UE either in a configuration of a measurement set of resources or in a configuration of a CSI feedback. The appropriate PUCCH or PUSCH may be informed to the UE by either indicating a corresponding group of generalized cell identities or by explicitly configuring parameters.

According to an example embodiment, dynamic scheduling may be performed within each of the communications system resource groups. As an example, dynamic DMRS selection or changing of PDSCH and/or PUSCH. Additionally, cross cell scheduling within each communications system resource group to obtain cross cell scheduling benefits within the communications system resource group. Cross cell scheduling may support frequency domain interference coordination or spatial domain interference coordination for control channels, for example.

Since each group may use the same generalized UE identity, it may be possible to simplify the communications system by reducing signaling overhead as it pertains to the generalized UE identity, for example. With multiple generalized UE identities for multiple communications system resource groups, it may be possible to avoid complex UE identity allocation coordination or avoid allocation collisions altogether. Furthermore, with single aperiodic CQI triggering scheme with a PDCCH and/or EPDCCH for a communications system resource group, it may be possible to reduce overhead and provide support for the dynamic triggering of CSI-RS measurement of each CSI-RS within the communications system resource group. Additionally, with ACK/NACK resource allocation being performed for each communications system resource group, it may be possible to use a multiplexing technique with multiple ACK/NACK to reduce uplink peak to average power ratio (PAPR) or cubic metric, while maintaining flexibility in ACK/NACK resource allocation for different communications system resource groups.

According to an example embodiment, generalized cell identities may be grouped. The generalized cell identities may not correspond to an actual cell and may not be used for a UE to detect an actual cell. The grouping of generalized cell identities may reduce UE complexity; particularly as it relates to UE dedicated signaling or UE dedicated RRC signaling.

According to an example embodiment, second communications system resources may be processed in accordance with communications system resource groups to reduce coordination and/or processing requirements on backhaul availability and capability. As with communications system resource groups, backhaul availability and capability may also play a role in the coordination and/or processing of second communications system resources. As an example, a scheduling request or a buffer status report received by a cell may not be readily transferred via a backhaul to another cell if the two cells are not connected by a fast backhaul. Hence, even if a cell is informed of the scheduling request or buffer status report from the UE, another cell might not be so easily informed if the two cells are not connected by a fast backhaul. Therefore, the second communications system resources may be processed per communications system resource group to reduce coordination and/or processing through a backhaul. However, if the backhaul link is sufficiently fast and coordination and/or processing capability is present, it may be possible to simplify the design of communications system resource groups.

As an illustrative example, a UE may be associated with a group of generalized cell identities, channels, resources, and communications system resource groups. However, according to Rel-8, a UE has only one compatible cell to support the full functionality or features of an actual cell. A cell group that contains the compatible cell may be seen as a primary cell group and other cell groups may be classified as secondary cell groups. The primary cell group and secondary cell groups may be explicitly or implicitly indicated to the UE.

Across cell groups semi-static coordination is generally supported. As an example, frequency division multiplexing (FDM), time division multiplexing (TDM), intercell interference coordination (ICIC), enhanced ICIC, further enhanced ICIC, coordinated beam blanking (CBB), interference measurement resource (IMR) coordination, as well as other coordination techniques that does not require a fast backhaul may be supported, with corresponding signaling being supported and defined over the backhaul. Typically, each cell group has its own group-specific resources. Nevertheless, cross-group operations are not necessarily excluded. As an example, a first cell group may send signals to a UE to configure a second cell group for the UE. In other words, the configuration of the second cell group does not necessarily come from resources of the second cell group and channels. An example application may be when the UE is first configured with the first cell group and the UE receives the configuration regarding the second cell group before the UE establishes connection or receives signals from the second cell group. The first cell group (which may be the primary cell group of the UE) may alter the configuration of a second cell group (which may be the secondary cell group of the UE) when deemed necessary, though the second cell group may also be allowed to alter its own configuration or that of other secondary cell groups.

It may be possible to use the signaling typically used to carry information about the communications system resource groups to incrementally configure communications system resources. As an example, a UE may have groups of resources and more resources may become available at a later time for the UE to use. A new resource may be assigned to an existing communications system resource group or it may be assigned to a new communications system resource group. Generally, the assignment of the new resource may require signaling to support the adding, removing, or modifying of a resource configuration of a communications system resource group. Implicit and/or explicit grouping and implicit and/or explicit indexing of groupings and/or groups may be used to facilitate the procedure.

Figure 16:
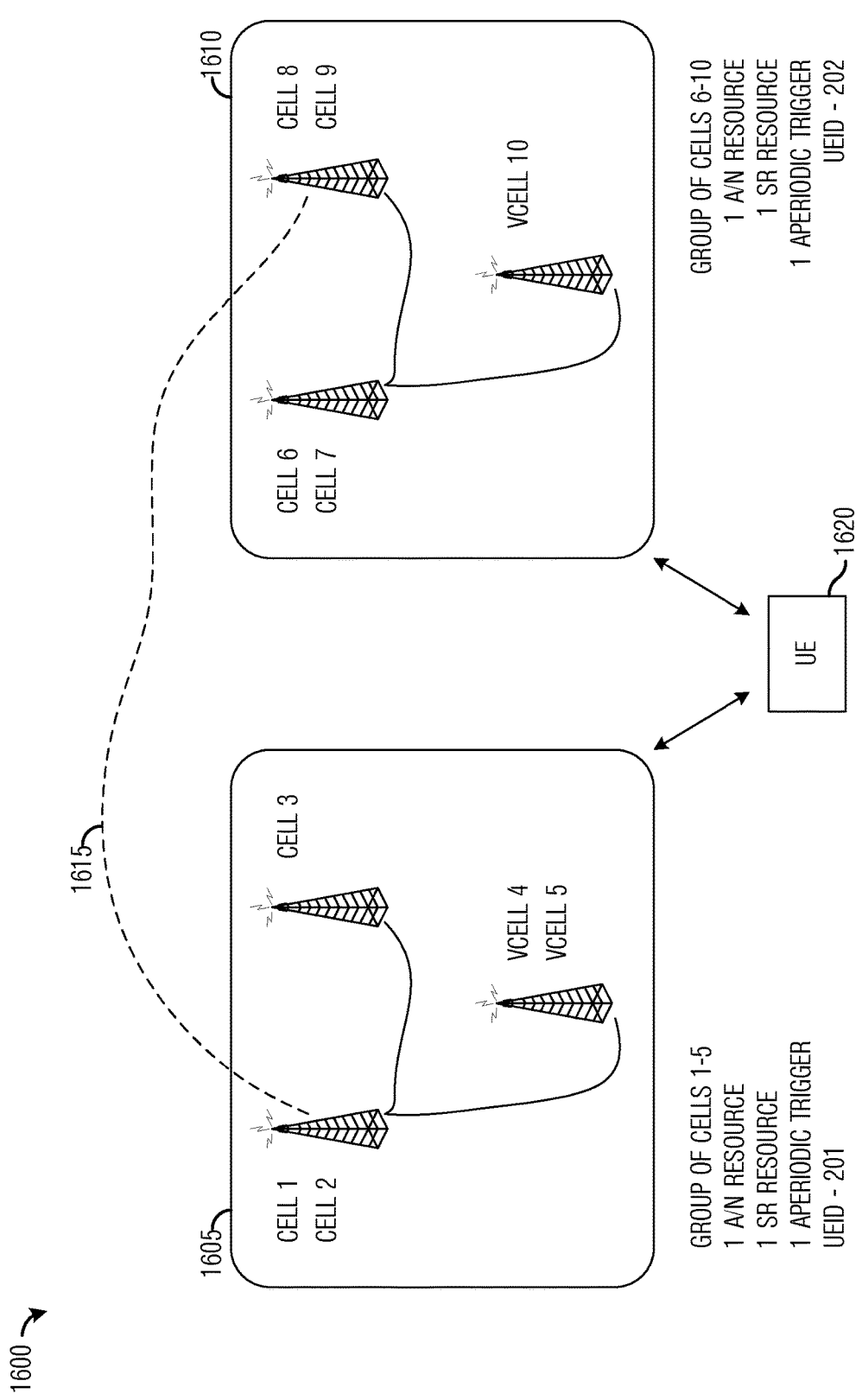
FIG. 16 illustrates an example communications system highlighting resource management according to example embodiments described herein.

FIG. 16 illustrates a communications system 1600 highlighting resource management. Communications system 1600 includes a first communications system resource group 1605 that includes generalized cell identities that are associated with an eNB or are connected by a fast backhaul to the eNB. Generalized cell identities in first communications system resource group 1605 include: cell 1, cell 2, cell 3, vcell 4, and vcell 5. Communications system 1600 also includes a second communications system resource group 1610 that includes general cell identities: cell 6, cell 7, cell 8, cell 9, and vcell 10. First communications system resource group 1605 and second communications system resource group 1610 may be connected by a slow backhaul 1615. As shown in FIG. 16, first communications system resource group 1605 includes one ACK/NACK resource, one SR resource, and one aperiodic trigger with a generalized UE identity of 201, and second communications system resource group 1610 includes one ACK/NACK resource, one SR resource, and one aperiodic trigger with a generalized UE identity of 202. First communications system resource group 1605 and second communications system resource group 1610 may be communicating with UE 1620.

Figure 17A:
FIG. 17a illustrates an example communications configuration using CoMP according to example embodiments described herein.

FIG. 17a illustrates an example communications configuration using CoMP. As shown in FIG. 17a, generalized cell identities (or generalized virtual cell identities) associated with a single eNB or a plurality of eNBs connected by a fast backhaul may be grouped into communications system resource groups with one ACK/NACK resource per communications system resource group.

FIG. 17b illustrates an example communications configuration using CA and CoMP. As shown in FIG. 17b, the grouping of first communications system resources is scalable and simplify a solution to integrate multiple communications system resources (e.g., component carriers, cells, vcells, and the like) that are connected by a fast backhaul or any backhaul. An eNB may signal several ACK/NACK resource allocations with each for a grouping of HARQ processes within a subframe. In each ACK/NACK resource, binary phase shift keying, quadrature phase shift keying, and/or DFT-S-OFDM may be used to transmit ACK/NACK feedback. The eNB may signal several groups of cell identities and/or virtual cell identities with each group including one or more HARQ processes of PDSCH and/or PUSCH indicated by one or more PDCCH and/or EPDCCH. Within each group of HARQ processes, cross cell scheduling may be used.

Each group of HARQ processes or group of PDCCH and/or EPDCCH, there may be an assigned UE identity. The UE identity may be assigned by an eNB or an entity in the communications system. In other words, the UE identity for each group is independently assigned. This is contrasted with Rel-10 and Rel-11, where the UE identity for multiple component carriers or multiple cells is the same. In a situation with any backhaul, it may be difficult to coordinate UE identity assignment between two cells without a fast backhaul. Hence, independent UE identity assignment may be utilized on a group by group basis. Within each group, it may be easy to coordinate UE identity assignment, therefore, the same UE identity may be used for multiple cells within a single group. The UE identity (other than at the primary cell) may be used as a PDCCH and/or EPDCCH CRC mask and may not have the full functionality of an actual UE identity, i.e., a cell radio network temporary identifier (C-RNTI).

It may be possible for an eNB to signal several groups of CSI-RS and/or CRS resources for measurement purposes and have each CSI-RS and/or CRS resource correspond to a CQI measurement. The eNB may use a PDCCH and/or EPDCCH to trigger an aperiodic CQI report for a set of CSI-RS resources within each group of CSI-RS and/or CRS resources, reusing Rel-10 schemes for multiple cell CQI feedback, for example.

It may also be possible to assign a scheduling request resource to a UE for each communications system resource group. Within each communications system resource group, a single scheduling request resource is sufficient since scheduling is generally performed across cells of a single communications system resource group. For different communications system resource groups, different scheduling request resources may be assigned to differentiate different uplink transmission requirements. An eNB may determine the transmission of a PDCCH and/or EPDCCH according to different scheduling requests sent by the UE.

Coordination and/or processing between cells that are not connected with a fast backhaul may be avoided and/or reduced. As an example, the allocation of UE identity, aperiodic CQI feedback, downlink and/or uplink grant transmission, PDSCH transmission, and the like, may avoided if they involve cells that are not connected with a fast backhaul.

Within a communications system resource group, complexity may be reduced (or efficiency may be increased) based on an assumption that joint scheduling may be performed within the communications system resource group.

Communications system resources may be partitioned into several groups, wherein within each group coordination and/or processing may be performed as in Rel-11 and prior technical standards (i.e., legacy operation). However, in between groups a different mode of operation is used to enable the deployment of any backhaul. In general, the UE does not need to know whether a fast backhaul or any backhaul is used because UE dedicated signaling is used to inform the UE of the configuration of the multiple groups of resources.

Figure 18:
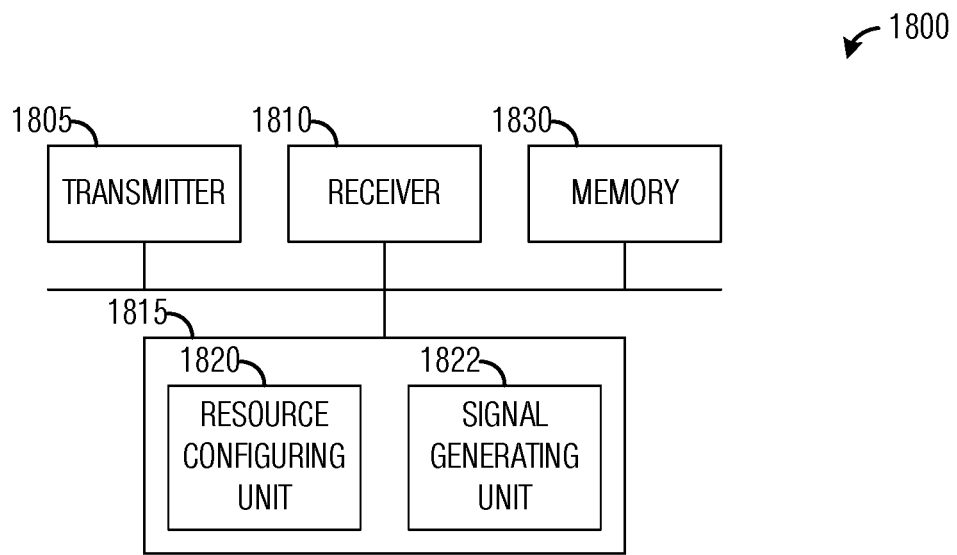
FIG. 18 illustrates an example first communications device according to example embodiments described herein.

FIG. 18 illustrates a first communications device 1800. Communications device 1800 may be an implementation of controlling device, such as an eNB or a centralized controller, that configures communications system resources in accordance with backhaul characteristics. Communications device 1800 may be used to implement various ones of the embodiments discussed herein. As shown in FIG. 18, a transmitter 1805 is configured to transmit packets, information about communications system resource groups, sets of communications system resources, and the like. Communications device 1800 also includes a receiver 1810 that is configured to receive packets, and the like.

A resource configuring unit 1820 is configured to specify first communications system resources in accordance with the backhaul characteristics to form communications system resource groups. Resource configuring unit 1820 is configured to specify a set of second communications system resources for each of the communications system resource groups. A signal generating unit 1822 is configured to generate signaling for information about the communications system resource groups, the sets of second communications system resources, and the like, for transmission to a UE. A memory 1830 is configured to store information and/or configurations of first communications system resources, communications system resource groups, sets of second communications system resources, and the like.

The elements of communications device 1800 may be implemented as specific hardware logic blocks. In an alternative, the elements of communications device 1800 may be implemented as software executing in a processor, controller, application specific integrated circuit, or so on. In yet another alternative, the elements of communications device 1800 may be implemented as a combination of software and/or hardware.

As an example, receiver 1810 and transmitter 1805 may be implemented as a specific hardware block, while resource configuring unit 1820 and signal generating unit 1822 may be software modules executing in a microprocessor (such as processor 1815) or a custom circuit or a custom compiled logic array of a field programmable logic array. Resource configuring unit 1820 and signal generating unit 1822 may be modules stored in memory 1830.

Figure 19:
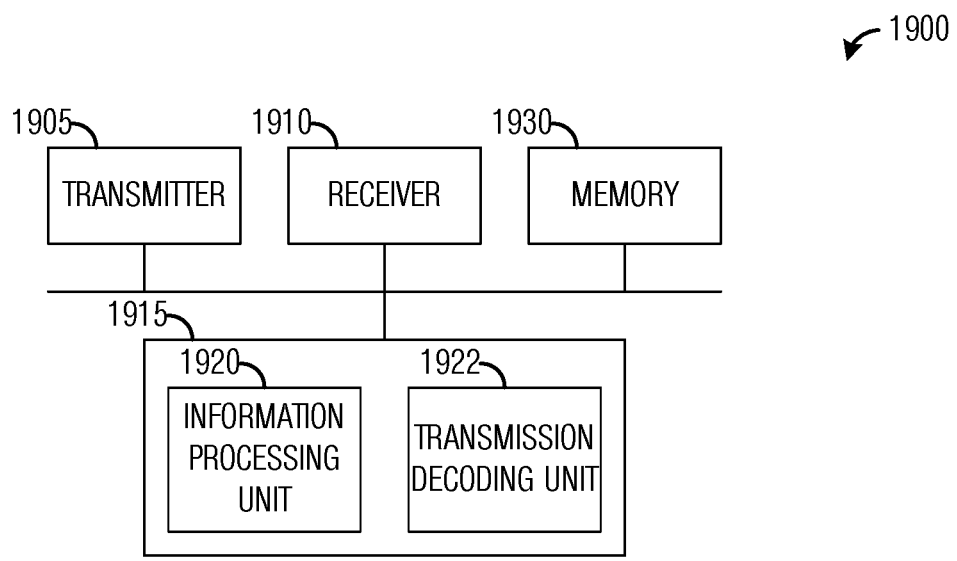
FIG. 19 illustrates an example second communications device according to example embodiments described herein.

FIG. 19 illustrates a second communications device 1900. Communications device 1900 may be an implementation of a UE. Communications device 1900 may be used to implement various ones of the embodiments discussed herein. As shown in FIG. 19, a transmitter 1905 is configured to transmit packets, information utilizing one or more sets of second communications system resources, and the like. Communications device 1900 also includes a receiver 1910 that is configured to receive packets, information about communications system resource groups, sets of communications system resources, and the like.

An information processing unit 1920 is configured to process information about communications system resource groups formed from a configuring of a set of first communications system resources in accordance with a backhaul characteristic. Information processing unit 1920 is configured to process information about sets of second communications system resources, one set per communications system resource groups. A transmission decoding unit 1922 is configured to decode signals of resources as specified by the information about the communications system resource groups and the sets of second communications system resources. A memory 1930 is configured to store information and/or configurations of first communications system resources, communications system resource groups, sets of second communications system resources, and the like.

The elements of communications device 1900 may be implemented as specific hardware logic blocks. In an alternative, the elements of communications device 1900 may be implemented as software executing in a processor, controller, application specific integrated circuit, or so on. In yet another alternative, the elements of communications device 1900 may be implemented as a combination of software and/or hardware.

As an example, receiver 1910 and transmitter 1905 may be implemented as a specific hardware block, while information processing unit 1920 and transmission decoding unit 1922 may be software modules executing in a microprocessor (such as processor 1915) or a custom circuit or a custom compiled logic array of a field programmable logic array. Information processing unit 1920 and transmission decoding unit 1922 may be modules stored in memory 1930.

Although the present disclosure and its advantages have been described in detail, it should be understood that various changes, substitutions and alterations can be made herein without departing from the spirit and scope of the disclosure as defined by the appended claims.

What is claimed is:

1. A method for wireless communications, the method comprising:
   signaling, by a controller device, information about a plurality of network element groups to a first user equipment, each network element in the plurality of network element groups associated with a network element identifier;
   signaling, by the controller device, information about a set of communications system resources for each of the plurality of network element groups to the first user equipment, each set of communications system resources including a respective generalized user equipment identifier, each set of communications system resources comprising a physical uplink control channel (PUCCH) and a physical uplink shared channel (PUSCH), and the information about each set of communications system resources including information that indicating whether simultaneous transmission of the PUCCH and the PUSCH is present;
   transmitting, to the first user equipment by a first network element associated with a first network element group in the plurality of network element groups, first data on a first set of communications system resources associated with the first network element group and using a first generalized user equipment identifier; and transmitting, to the first user equipment by a second network element associated with a second network element group in the plurality of network element groups, second data on a second set of communications system resources associated with the second network element group and using a second generalized user equipment identifier different from the first generalized user equipment identifier, while the first network element is connected to the first user equipment.

2. The method of claim 1, wherein the plurality of network element groups are configured in accordance with a characteristic of a backhaul connection between the associated network elements.

3. The method of claim 2, wherein the associated network elements comprise at least one of a virtual cell or a fully featured cell.

4. The method of claim 2, wherein the characteristic of the backhaul connection comprises at least one of a latency of the backhaul connection, a latency threshold of the backhaul connection, a latency range of the backhaul connection, a data rate of the backhaul connection, or a bandwidth of the backhaul connection.

5. The method of claim 2, wherein first network elements associated with the first network element group are connected with first backhaul connections having the characteristic.

6. The method of claim 5, wherein second network elements associated with the second network element group are connected with second backhaul connections having the characteristic.

7. The method of claim 1, wherein each set of communications system resources comprises at least one of scheduling request resources or buffer status reports.

8. The method of claim 1, wherein each set of communications system resources comprises uplink transmission power.

9. The method of claim 1, wherein each set of communications system resources comprises timing advance signaling.

10. The method of claim 1, wherein each set of communications system resources comprises one of a PDCCH or an EPDCCH.

11. The method of claim 1, wherein each set of communications system resources comprises a set of channel state information reference signals (CSI-RS), and wherein each set of communications system resources comprises one of a PDCCH or an EPDCCH to trigger a channel state information (CSI) report for a CSI-RS in the set of CSI-RS.

12. The method of claim 1, wherein each set of communications system resources are configured independently for each of the plurality of network element groups.

13. The method of claim 1, wherein the network element identifier is a physical cell ID (PCID) or a virtual cell ID (VCID).

14. The method of claim 1, wherein the first network element group is a primary cell group containing at least a primary cell (PCell).

15. The method of claim 14, wherein the second network element group is a secondary cell group comprising secondary cells (SCells).

16. The method of claim 15, wherein the primary cell group and the secondary cell group maintain dual connectivity to the first user equipment.

17. A method for wireless communications, the method comprising:

signaling, by a controller device, information about a plurality of network element groups to a first user equipment, each network element in the plurality of network element groups associated with a network element identifier;

signaling, by the controller device, information about a set of communications system resources for each of the plurality of network element groups to the first user equipment, each set of communications system resources including a respective generalized user equipment identifier, each set of communications system resources comprising a set of demodulation reference signals for a physical downlink shared channel (PDSCH), and each set of communications system resources comprising a PDCCH or an EPDCCH channel to indicate a demodulation reference signal (DMRS) belonging to the set of demodulation reference signals for the PDSCH;

transmitting, to the first user equipment by a first network element associated with a first network element group in the plurality of network element groups, first data on a first set of communications system resources associated with the first network element group and using a first generalized user equipment identifier; and transmitting, to the first user equipment by a second network element associated with a second network element group in the plurality of network element groups, second data on a second set of communications system resources associated with the second network element group and using a second generalized user equipment identifier different from the first generalized user equipment identifier, while the first network element is connected to the first user equipment.

18. A method for multiple point communications, the method comprising:

receiving, at a user equipment, information from a communications controller about a plurality of network element groups in a communications system, each network element in the plurality of network element groups associated with a network element identifier;

receiving, at the user equipment, information from the communications controller about a set of communications system resources for each of the plurality of network element groups, each set of communications system resources including a respective generalized user equipment identifier, each set of communications system resources comprising a physical uplink control channel (PUCCH) and a physical uplink shared channel (PUSCH), and the information about each set of communications system resources including information indicating whether simultaneous transmission of the PUCCH and the PUSCH is present;

receiving, at the user equipment from a first network element associated with a first network element group in the plurality of network element groups, first data on a first set of communications system resources associated with the first network element group and using a first generalized user equipment identifier; and receiving, at the user equipment from a second network element associated with a second network element group in the plurality of network element groups, second data on a second set of communications system resources associated with the second network element group and using a second generalized user equipment identifier different from the first generalized user equipment identifier, while the user equipment is connected to the first network element.

19. The method of claim 18, wherein the network element identifier is a physical cell ID (PCID) or a virtual cell ID (VCID).

20. The method of claim 18, wherein the first network element group is a primary cell group containing at least a primary cell (PCell).

21. The method of claim 20, wherein the second network element group is a secondary cell group comprising secondary cells (SCells).

22. The method of claim 21, wherein user equipment maintains dual connectivity to the primary cell group and the secondary cell group.

23. A wireless communications system, comprising:
a controller device having a transmitter configured to:
signal information about a plurality of network element groups to a first user equipment, each network element in the plurality of network element groups associated with a network element identifier, and
signal information about a set of communications system resources for each of the plurality of network element groups to the first user equipment, each set of communications system resources including a respective generalized user equipment identifier, each set of communications system resources comprising a physical uplink control channel (PUCCH) and a physical uplink shared channel (PUSCH), and the information about each set of communications system resources including information indicating whether simultaneous transmission of the PUCCH and the PUSCH is on;
a first network element associated with a first network element group in the plurality of network element groups, and configured to transmit, to the first user equipment, first data on a first set of communications system resources associated with the first network element group and using a first generalized user equipment identifier; and
a second network element associated with a second network element group in the plurality of network element groups, and configured to transmit, to the first user equipment, second data on a second set of communications system resources associated with the second network element group and using a second generalized user equipment identifier different from the first generalized user equipment identifier, while the first network element is connected to the first user equipment.

24. The wireless communications system of claim 23, wherein each set of communications system resources comprises at least one of scheduling request resources or buffer status reports.

25. The wireless communications system of claim 23, wherein each set of communications system resources comprises uplink transmission power.

26. The wireless communications system of claim 23, wherein each set of communications system resources are configured independently for each of the plurality of network element groups.

27. The wireless communications system of claim 23, wherein the network element identifier is a physical cell ID (PCID) or a virtual cell ID (VCID).

28. The wireless communications system of claim 23, wherein the first network element group is a primary cell group containing at least a primary cell (PCell).

29. The wireless communications system of claim 28, wherein the second network element group is a secondary cell group comprising secondary cells (SCells).

30. The wireless communications system of claim 29, wherein the primary cell group and the secondary cell group are configured to maintain dual connectivity to the first user equipment.

31. A user equipment comprising:
a processor; and
a receiver operatively coupled to the processor and configured to:
receive information from a controller device about a plurality of network element groups of a communications system, each network element in the plurality of network element groups associated with a network element identifier;
receive information from the controller device about a set of communications system resources for each of the plurality of network element groups, each set of communications system resources including a respective generalized user equipment identifier, each set of communications system resources comprising a physical uplink control channel (PUCCH) and a physical uplink shared channel (PUSCH), and the information about each set of communications system resources including information indicating whether simultaneous transmission of the PUCCH and the PUSCH is on;
receive, from a first network element associated with a first network element group in the plurality of network element groups, first data on a first set of communications system resources associated with the first network element group and using a first generalized user equipment identifier; and
receive, from a second network element associated with a second network element group in the plurality of network element groups, second data on a second set of communications system resources associated with the second network element group and using a second generalized user equipment identifier different from the first generalized user equipment identifier, while the user equipment is connected to the first network element.

32. The user equipment of claim 31, wherein the network element identifier is a physical cell ID (PCID) or a virtual cell ID (VCID).

33. The user equipment of claim 31, wherein the first network element group is a primary cell group containing at least a primary cell (PCell).

34. The user equipment of claim 33, wherein the second network element group is a secondary cell group comprising secondary cells (SCells).

35. The user equipment of claim 34, wherein the processor is configured to maintain, for the user equipment, dual connectivity to the primary cell group and the secondary cell group.

* * * * *